(12) United States Patent
Taguchi

(10) Patent No.: US 7,723,964 B2
(45) Date of Patent: May 25, 2010

(54) POWER SUPPLY DEVICE

(75) Inventor: Yasutaka Taguchi, Kanagawa (JP)

(73) Assignee: Fujitsu General Limited, Kanagawa (JP)

( * ) Notice: Subject to any disclaimer, the term of this patent is extended or adjusted under 35 U.S.C. 154(b) by 363 days.

(21) Appl. No.: 11/793,265

(22) PCT Filed: Jul. 1, 2005

(86) PCT No.: PCT/JP2005/012239

§ 371 (c)(1),
(2), (4) Date: Jun. 15, 2007

(87) PCT Pub. No.: WO2006/064586

PCT Pub. Date: Jun. 22, 2006

(65) Prior Publication Data

US 2008/0130336 A1  Jun. 5, 2008

(30) Foreign Application Priority Data

Dec. 15, 2004  (JP) ............................. 2004-363532

(51) Int. Cl.
G05F 1/00 (2006.01)

(52) U.S. Cl. ..................................... 323/222

(58) Field of Classification Search ................ 323/222, 323/223, 225, 234, 268, 271, 282, 283, 285, 323/300, 319; 363/39, 44, 46, 84, 89, 125
See application file for complete search history.

(56) References Cited

U.S. PATENT DOCUMENTS

| | | | | |
|---|---|---|---|---|
| 4,825,351 A | * | 4/1989 | Uesugi | ........................ 363/79 |
| 5,019,952 A | * | 5/1991 | Smolenski et al. | ............ 363/16 |
| 5,612,609 A | * | 3/1997 | Choi | ........................... 323/210 |
| 5,614,812 A | * | 3/1997 | Wagoner | ..................... 323/222 |
| 5,615,098 A | * | 3/1997 | Ishii et al. | ..................... 363/84 |
| 5,764,039 A | * | 6/1998 | Choi et al. | ................... 323/222 |
| 6,657,417 B1 | * | 12/2003 | Hwang | ....................... 323/222 |
| 7,313,007 B2 | * | 12/2007 | Wu et al. | ....................... 363/65 |
| 2005/0270813 A1 | * | 12/2005 | Zhang et al. | ................... 363/89 |
| 2007/0103947 A1 | * | 5/2007 | Taguchi et al. | ................. 363/45 |

FOREIGN PATENT DOCUMENTS

| | | |
|---|---|---|
| JP | 9-247943 | 9/1997 |
| JP | 2002-199730 | 7/2002 |
| JP | 2004-007880 | 1/2004 |
| JP | 2004-164973 | 6/2004 |

\* cited by examiner

Primary Examiner—Adolf Berhane
Assistant Examiner—Yemane Mehari
(74) Attorney, Agent, or Firm—McDermott Will & Emery LLP

(57) ABSTRACT

A switching operation is performed on a switching element of a power-factor improving unit that includes a reactor. An output voltage of the power-factor improving unit is set to a load voltage by switching on and off the switching element based on a result of comparison between an input current and an input-current reference signal of a power-supply voltage waveform. A zero cross of an alternate-current power supply is detected, and the switching operation is performed on the switching element a predetermined number of times based on a detection of the zero cross.

25 Claims, 22 Drawing Sheets

FIG.5
(a) CURRENT HYSTERESIS WIDTH IS NARROW
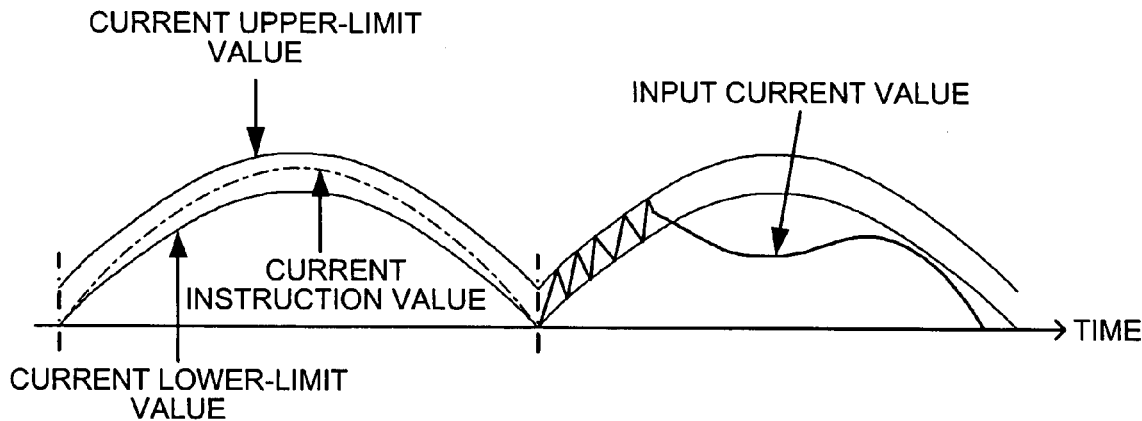
(b) CURRENT HYSTERESIS WIDTH IS WIDE
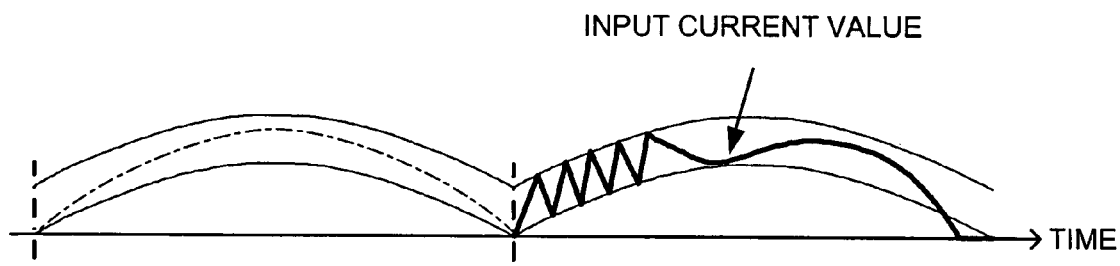
FIG.6
| PARAMETER | FLUCTUATION RANGE |
|---|---|
| INPUT CURRENT | 3 Arms TO 8 Arms |
| REACTOR INDUCTANCE | 15 mH TO 20 mH |
| CURRENT HYSTERESIS WIDTH | 0.9 A TO 1.3 A |
| NUMBER OF SWITCHING | 5 TIMES TO 10 TIMES |

POWER SUPPLY DEVICE

RELATED APPLICATIONS

This application is the U.S. National Phase under 35 U.S.C. §371 of International Application No. PCT/JP2005/012239, filed on Jul. 1, 2005, which in turn claims the benefit of Japanese Application No. 2004-363532, filed on Dec. 15, 2004, the disclosures of which Applications are incorporated by reference herein.

TECHNICAL FIELD

The present invention generally relates to a technique to control a power supply circuit that converts a commercial power supply to a power supply used by home electric appliances and the like. More specifically, the present invention relates to a power supply device that is of a voltage boosting chopper type and has a power factor improving function and a harmonic current suppressing function.

BACKGROUND ART

One example of the power supply device described above is shown in FIG. 23. In this power supply device, a full-wave rectification process is performed on an input power supply (a commercial power supply) 1 by a rectifying circuit 2, and a voltage on which an alternate current/direct current (AC/DC) conversion has been performed is raised to a voltage at a predetermined level by a voltage-boosting chopper circuit (a power-factor improving unit) 3. Also, the power factor of the power supply is improved, and harmonic currents are suppressed.

In this situation, the voltage-boosting chopper circuit 3 includes: a voltage-boosting choke coil (a reactor) 3a that is connected in series to the positive terminal side of the rectifying circuit 2; a reverse-blocking diode 3b that is connected in series to the voltage-boosting choke coil 3a; a switching element (e.g. an Insulated Gate Bipolar Transistor [IGBT]) 3c that is provided between the voltage-boosting choke coil 3a and the reverse-blocking diode 3b and is connected to the negative terminal side of the rectifying circuit 2; and a smoothing capacitor 3d that smoothes an output voltage.

An operation of the voltage-boosting chopper circuit 3 is to cause a short circuit with a switching operation of the switching element 3c via the voltage-boosting choke coil 3a and also to supply the voltage on which the switching operation is performed to the smoothing capacitor 3d from the reverse-blocking diode 3b so that the voltage is used as the voltage of a load 4. For example, in a case where the power supply device is applied to a compressor motor of an air conditioner, it is assumed that the load 4 includes an inverter circuit 4a and a motor 4b.

The present applicant filed Japanese Patent Application No. 2002-158653 that is related to a controlling method for a power supply device including the voltage-boosting chopper circuit 3 described above. The invention described in this application filed earlier will be briefly explained with reference to FIGS. 24 to 26. When an AC power supply is converted into a DC-voltage to be used as a load voltage, the converted voltage is short-circuited via at least a reactor (the voltage-boosting choke coil 3a) so that the power factor is improved.

The power supply device includes: a power-supply phase detecting circuit 5 that is operable to detect a zero cross of an AC power supply 1; a current sensor 6 that is operable to detect an input current Ii of the voltage-boosting chopper circuit 3; a control unit 8 that controls the switching element 3c based on the detected values as well as an input voltage Vi and an output voltage Vo of the voltage-boosting chopper circuit 3; and a driving unit 7 that drives the switching element 3c according to a signal from the control unit 8.

The control unit 8 performs a switching operation on the switching element 3c of the voltage-boosting chopper circuit 3 and also switches on and off the switching element 3c according to a comparison result between the input current and an input-current reference signal having a sinusoidal waveform so that the output voltage Vo of the voltage-boosting chopper circuit 3 is used as the voltage of the load.

In this situation, as shown in FIG. 24, a calculating unit 8a calculates a deviation between an output-voltage instruction value and the detected output voltage Vo. Based on the calculated deviation, a current-reference-signal amplitude generating unit 8b generates an amplitude value of an input-current reference signal Ir (an amplitude value having a sinusoidal waveform and being used as a so-called reference).

A multiplying unit 8c multiplies the generated amplitude value by the detected input voltage Vi. A hysteresis comparator 8d generates a hysteresis based on the result of the multiplication, i.e., the input-current reference signal (a current instruction value) and the current detection value Ii. An upper-limit value and a lower-limit value for the input current are generated based on the hysteresis. In other words, the switching operation is performed on the switching element 3c so that the input current Ii falls in a range defined by the upper-limit value and the lower-limit value.

On the other hand, the power-supply phase detecting circuit 5 detects a zero cross of the AC power supply. Also, a switching-operation-prohibited-time generating unit 8e generates a predetermined time between a point in time that is a predetermined time before the zero cross and the zero cross. The hysteresis output is prohibited by an AND circuit 8f, based on the generated signal.

As a result, as shown in FIGS. 25 and 26, the switching operation of the switching element 3c is prohibited only during the prohibition interval. Thus, the input current is forced to be zero at the zero-cross point of the input AC power supply. Accordingly, the input AC waveform near the zero-cross point is improved (the input AC waveform becomes closer to a sinusoidal waveform), and it is therefore possible to reduce high-order harmonic currents.

DISCLOSURE OF INVENTION

Problem to be Solved by the Invention

However, during the control of the voltage-boosting chopper circuit 3, near an interval in which the input voltage Vi is larger than the output voltage Vo (Vi≧Vo interval; a peak zone of the input current Ii), the input current Ii reaches the lower-limit value due to fluctuations in the input voltage and the output voltage or the fluctuations in the load 4. Thus, if the number of times the switching operation is performed on the switching element 3c increases, a problem is caused by the current control.

For example, as shown in FIG. 25, when the input current Ii does not reach the lower-limit value (when the fluctuation in the negative direction is small), the number of times the switching operation is performed on the switching element 3c does not increase. In contrast, as shown in FIG. 26, when the input current Ii reaches the lower-limit value, the number of times the switching operation is performed on the switching element 3c increases. In other words, the number of times the switching operation is performed in each half cycle of the AC power supply varies, i.e., the number of times of the switching operation fluctuates and is not constant.

When the number of times of the switching operation in each half cycle of the AC power supply varies, it means that the current control is not stable. Also, not only the reduction of high-order harmonic currents is inhibited, but also it becomes difficult to comply with regulations related to power supply harmonics. In addition, it becomes impossible to supply a stable electric power to the load because the output voltage is influenced even by one switching operation. In particular, when the load 4 is a motor, the number of revolutions of the motor is not stable, and thus noise may be caused.

Means for Solving Problem

To solve the above problems, a power supply device according to the present invention improves, when setting a voltage obtained by converting an alternate-current power supply into a direct-current voltage to a load voltage, a power factor by short-circuiting the alternate-current power supply via a reactor. A switching operation is performed on a switching element of a power-factor improving unit that includes the reactor. An output voltage of the power-factor improving unit is set to the load voltage by switching on and off the switching element based on a result of comparison between an input current and an input-current reference signal of a power-supply voltage waveform. A zero cross of the alternate-current power supply is detected, and the switching operation is performed on the switching element a predetermined number of times based on a detection of the zero cross.

When the switching operation of the switching element is started based on the detection of the zero cross, it is preferable to set the starting time to either a positive value or a negative value with respect to the zero-cross detection. Also, it is preferable to change the starting time for the switching operation of the switching element according to the load of the power supply device and the level of the input current.

It is preferable to set the number of times the switching operation is performed on the switching element so that the switching operation is completed within 90 degrees of a power supply phase of the alternate-current power supply. Also, it is preferable to determine the number of times the switching operation is performed on the switching element, based on at least one of, or a combination of any of, the load of the power supply device, the level of the input current, and the power supply frequency.

Furthermore, when the load of the power supply device is a motor connected via an inverter, the number of switching can be determined based on any one of number of revolutions of the motor and an output frequency of the inverter.

It is preferable to configure, with software, the number of times the switching operation is performed on the switching element and the switching prohibiting control performed thereafter. Also, it is preferable to employ a voltage detecting unit that is operable to detect the voltage of the alternate-current power supply and to determine the number of times the switching operation is performed on the switching unit based on the detected voltage.

It is preferable that the switching operation of the switching element is completed in a predetermined time since the detection of the zero cross.

It is preferable that the number of switching the switching element is adjusted in such a manner that the switching operation of the switching element is completed in the predetermined time.

If the switching operation of the switching element is performed after the predetermined time, it is preferable that the switching operation of the switching element is performed by decreasing the number of switching by a predetermined number of times.

If the switching operation of the switching element is completed before the predetermined time, it is preferable that the switching operation of the switching element is performed by increasing the number of switching by a predetermined number of times.

It is preferable to provide a correcting unit that corrects the predetermined time, if the switching operation of the switching element is not completed in the predetermined time after changing the number of switching.

It is preferable that the number of switching the switching element is counted by a counter function, and the counter function is reset by the detection of the zero cross.

A power supply device according to the present invention improves, when setting a voltage obtained by converting an alternate-current power supply into a direct-current voltage to a load voltage, a power factor by short-circuiting the alternate-current power supply via a reactor. A switching operation is performed on a switching element of a power-factor improving unit that includes the reactor. An output voltage of the power-factor improving unit is set to the load voltage by switching on and off the switching element based on a result of comparison between an input current and an input-current reference signal of a power-supply voltage waveform, A zero cross of the alternate-current power supply is detected, and the switching operation of the switching element is completed by a next switching-off signal for the switching element, after a predetermined time has elapsed since a detection of the zero cross.

A power supply device according to the present invention improves, when setting a voltage obtained by converting an alternate-current power supply into a direct-current voltage to a load voltage, a power factor by short-circuiting the alternate-current power supply via a reactor. A switching operation is performed on a switching element of a power-factor improving unit that includes the reactor. An output voltage of the power-factor improving unit is set to the load voltage by switching on and off the switching element based on a result of comparison between an input current and an input-current reference signal of a power-supply voltage waveform. A zero cross of the alternate-current power supply is detected, and the switching operation of the switching element is forcibly completed in a predetermined time since a detection of the zero cross.

It is preferable that the predetermined time is changed according to any one of a frequency of the power supply, a level of a load, and a magnitude of the load voltage.

It is preferable that the predetermined time is set based on a relation between a time during which the switching operation of the switching element is permitted and an evaluation index related to harmonics when any one of the input current, a power supply voltage, a reactor inductance, a current hysteresis width, and number of switching is set as a parameter.

It is preferable to have an arrangement in which the predetermined time is set while the power factor is taken into consideration.

It is preferable to have an arrangement in which the predetermined time is set while a switching loss caused by the switching operation of the switching element is taken into consideration.

It is preferable that an output voltage at a time of a no-load state and an output voltage at a time of a loaded state are detected, and a voltage control is performed in such a manner that a ratio between the output voltage at the time of the no-load state and the output voltage at the time of the loaded state becomes a predetermined value.

It is preferable that the alternate-current power supply is converted into the direct-current voltage by a rectifying unit converts to be set as the load voltage, and any one of a rectified average value and an effective value is used instead of the output voltage at the time of the no-load state and the output voltage at the time of the loaded state.

It is preferable to have an arrangement in which the predetermined value is a value that has been calculated in advance according to the state of the load.

It is preferable to have an arrangement in which a ratio between an input voltage corresponding to a loaded state and an input voltage corresponding to a no-load state is used as the predetermined value.

It is preferable to have an arrangement in which the alternate-current power supply is converted by the rectifying unit into the direct-current voltage to be used as the load voltage, and also one of a rectified average value and an effective value is used, instead of the input voltage.

EFFECT OF THE INVENTION

According to an aspect of the present invention, the switching operation of the switching element is started at a zero cross of the AC power supply waveform, and also the switching operation is performed the predetermined number of times. Thus, it is possible to reduce high-order harmonics by making the input current waveform closer to a sinusoidal waveform and to stabilize the current control. Consequently, an advantageous effect is achieved where it is possible to easily comply with the power supply harmonic regulation.

Also, with the arrangement in which the counter used for counting the number of times the switching operation is performed is reset when a zero cross is detected, it is possible to exercise the current control for each half cycle of the AC power supply. Thus, it is possible to perform the current control appropriately. Also, because the time at which the switching operation is started is changed according to the load and the level of the input current, it is possible to make the input current waveform closer to a sinusoidal waveform by performing the current control.

In addition, the switching operation is performed within 90 degrees of the power supply phase. In other words, the switching operation is prohibited during an interval that includes an interval near the peak zone of the input current. Thus, as explained above, it is possible to make the input current waveform closer to a sinusoidal waveform, and to stabilize the current control. Also, because the number of times the switching operation is performed is determined by using the various types of parameters, it is possible to make the input current waveform closer to a sinusoidal waveform and to stabilize the current control in an optimal manner.

Further, when a motor operated by an inverter is used as the load based on which the number of times the switching operation is performed is determined, the number of revolutions of the motor or the inverter frequency is considered as the level of the load. Thus, in addition to the advantageous effects described above, the present invention is optimal especially for inverter air conditioners or refrigerators.

Furthermore, because the number of times the switching operation is performed and the switching control are configured with software, it is possible to keep the cost of the hardware in the power supply device from increasing. Also, because the number of times the switching operation is performed is a value that corresponds to the level of the voltage of the AC power supply, the present invention is applicable to home electric appliances in general and also to industrial equipment.

BRIEF DESCRIPTION OF DRAWINGS

FIG. 5 presents graphs for explaining current waveforms obtained in the power supply device when a current hysteresis width is narrow and when a current hysteresis width is wide.

FIG. 6 is a table of parameters and fluctuation ranges that are used to perform a measuring process shown in FIG. 7.

FIG. 20-1 is a diagram for explaining a twelfth embodiment of the present invention.

FIG. 20-2 is another diagram for explaining the twelfth embodiment.

FIG. 20-3 is yet another diagram for explaining the twelfth embodiment.

FIG. 20-4 is yet another diagram for explaining the twelfth embodiment.

EXPLANATIONS OF LETTERS OR NUMERALS

1: INPUT POWER SUPPLY (AC POWER SUPPLY)
2: RECTIFYING CIRCUIT
3: VOLTAGE-BOOSTING CHOPPER CIRCUIT
3a: VOLTAGE-BOOSTING CHOKE COIL
3b: REVERSE-BLOCKING DIODE
3c: SWITCHING ELEMENT
3d: SMOOTHING CAPACITOR
4: LOAD
5: POWER-SUPPLY PHASE DETECTING CIRCUIT
6: CURRENT SENSOR
7: DRIVING UNIT
13: CONTROL UNIT
10: INPUT-CURRENT DETECTING UNIT
11: INPUT-VOLTAGE DETECTING UNIT
12: OUTPUT-VOLTAGE DETECTING UNIT
13a: PULSE COUNTER
Ii: INPUT CURRENT
Vi: INPUT VOLTAGE
Vo: OUTPUT VOLTAGE

BEST MODE(S) FOR CARRYING OUT THE INVENTION

When performing a switching operation on a switching unit for a power-factor improving unit (a voltage-boosting chopper circuit) that includes a reactor, a power supply device according to the present invention performs the switching operation a predetermined number of times counted from when a zero cross is detected in the input current waveform (at least during a predetermined interval within 90 degrees of the power supply phase). In other words, the power supply device stabilizes the input current control and reduces high-order harmonic currents by prohibiting the switching operation even if there are fluctuations in the input voltage and the output voltage and fluctuations in the load 4, in a peak zone of the input current (near an interval in which the input voltage Vi is larger than the output voltage Vo).

Figure 1:
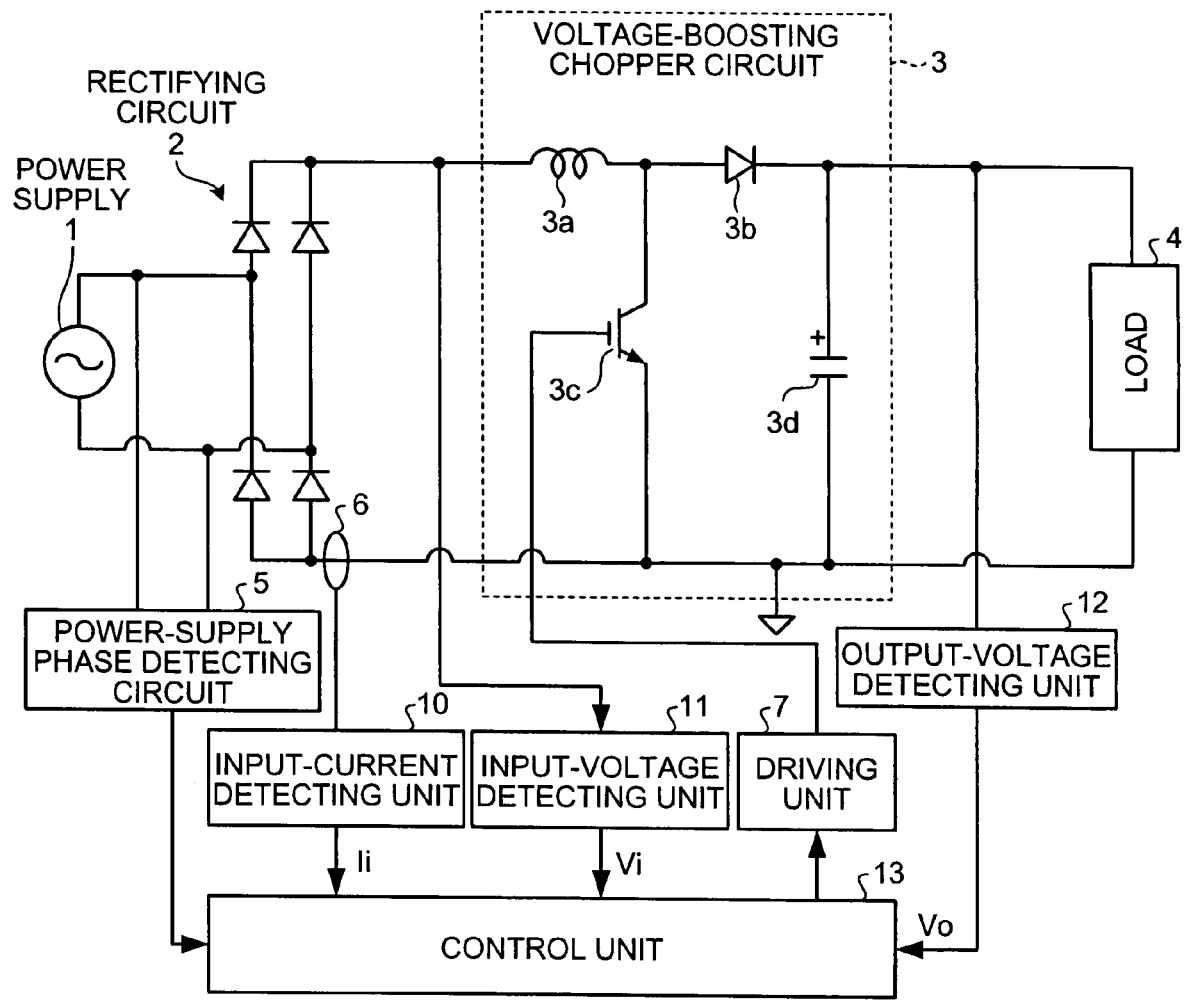
FIG. 1 is a schematic block diagram of a power supply device according to an embodiment of the present invention.
Figure 2:
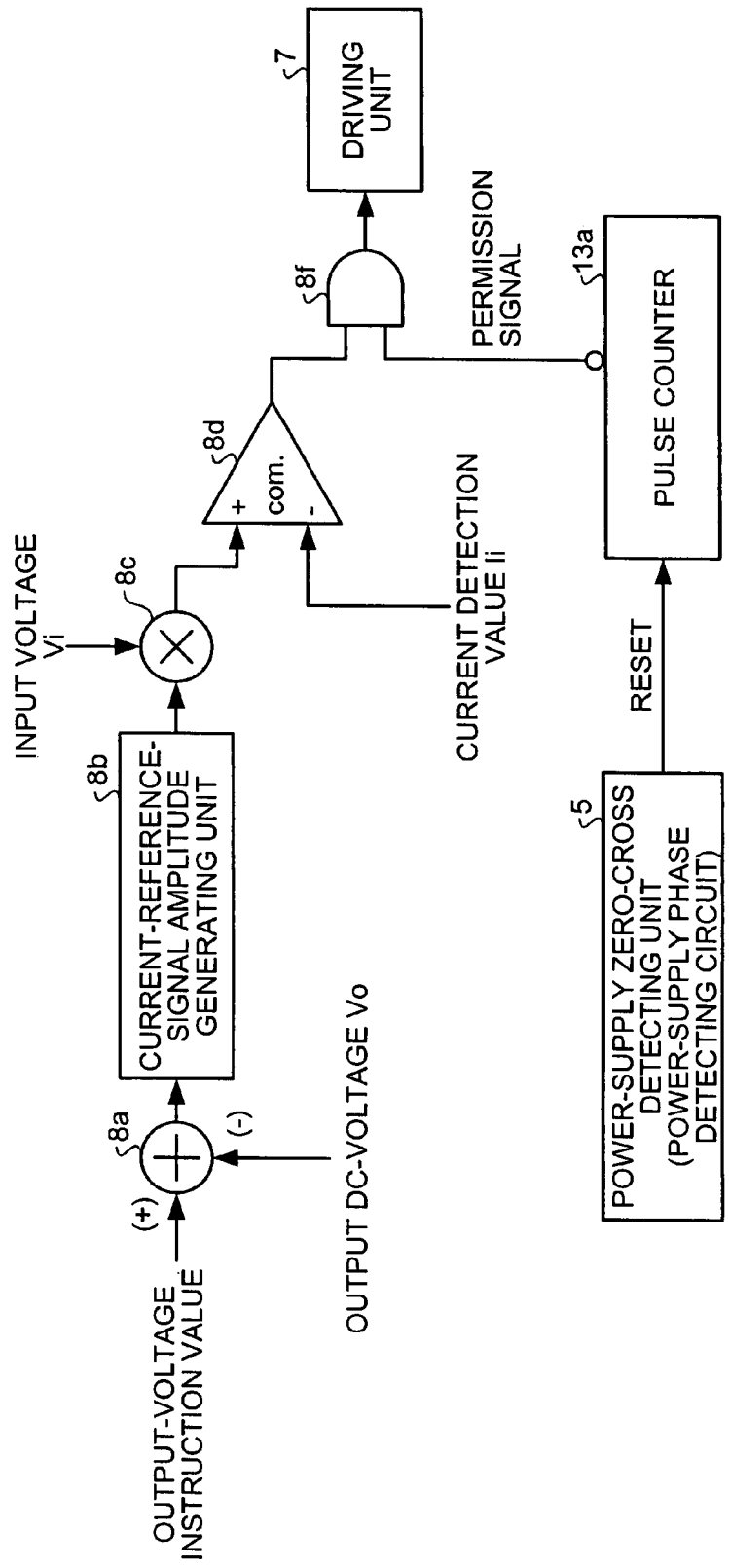
FIG. 2 is a schematic block diagram of a control unit included in the power supply device.
Figure 3:
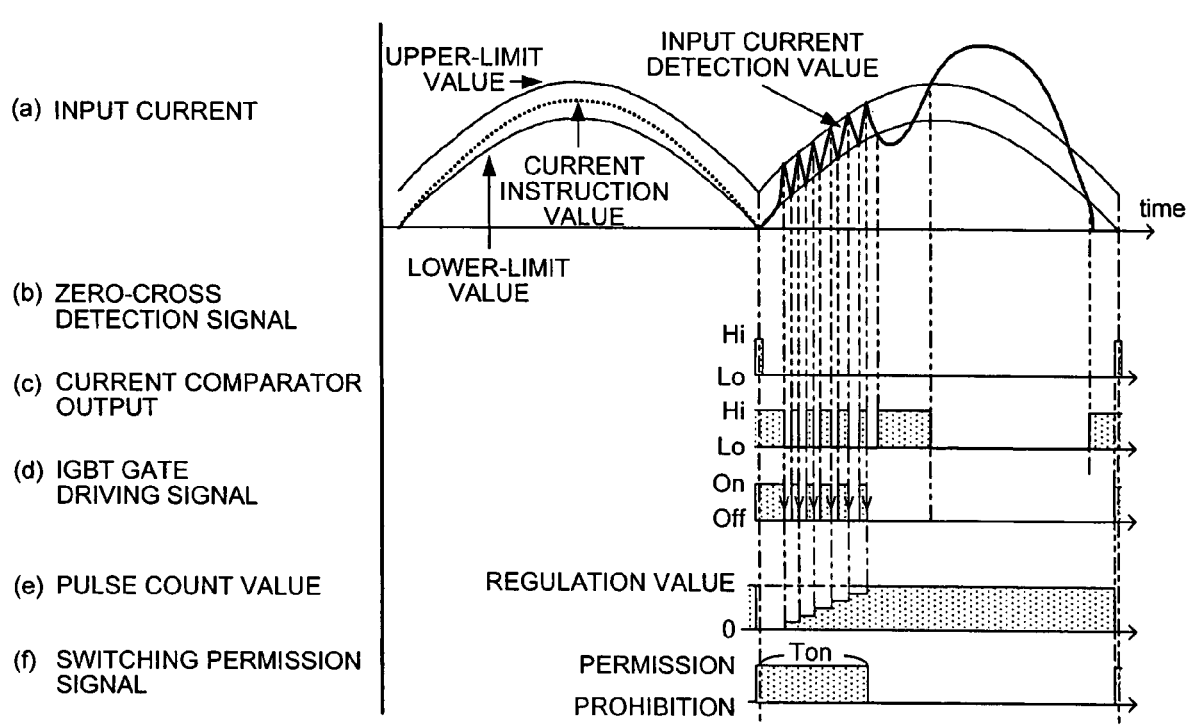
FIG. 3 presents a schematic waveform chart and a time chart for explaining an operation of the control unit.
Figure 23:
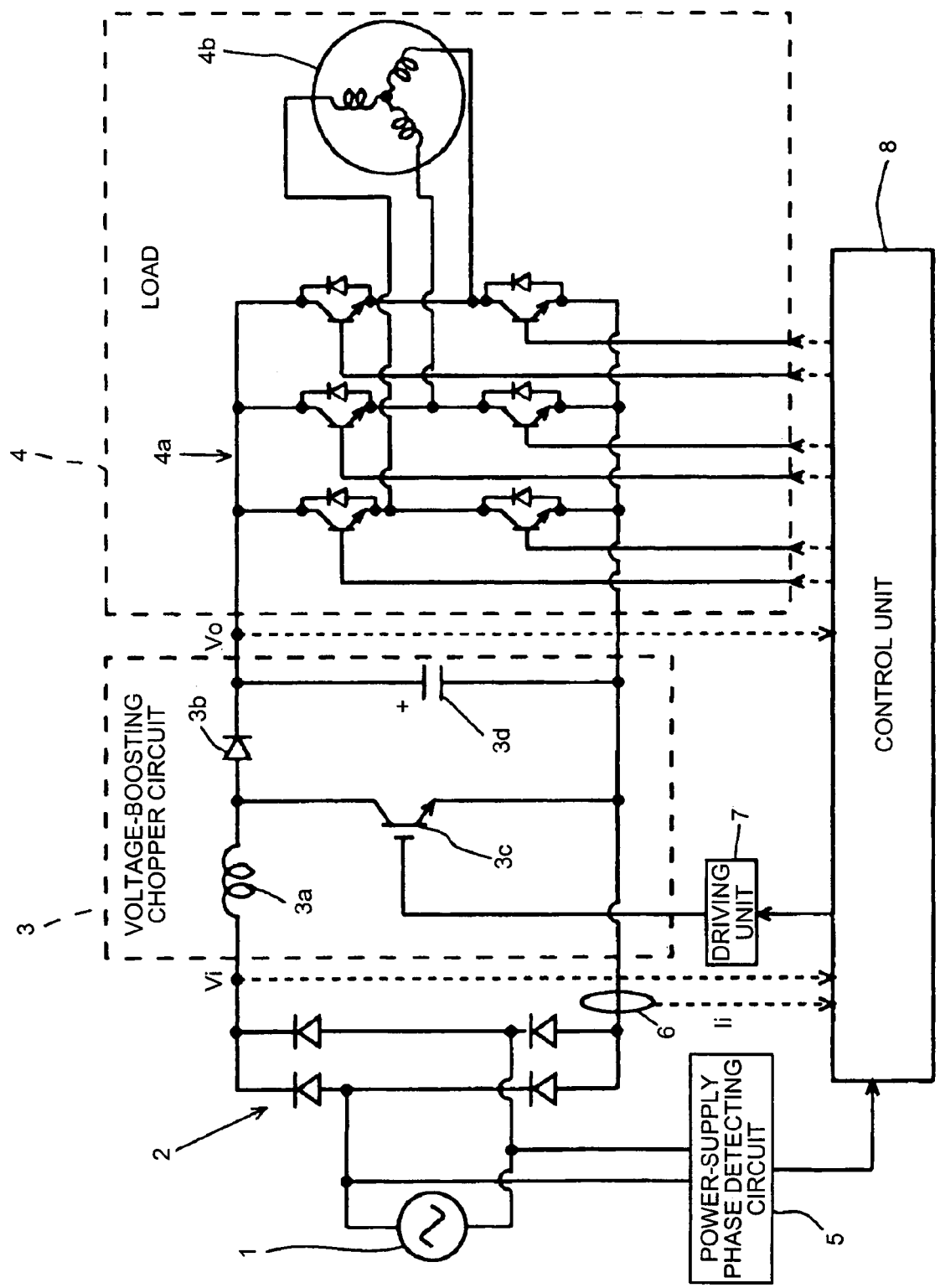
FIG. 23 is a schematic circuit diagram of a conventional power supply device.
Figure 25:
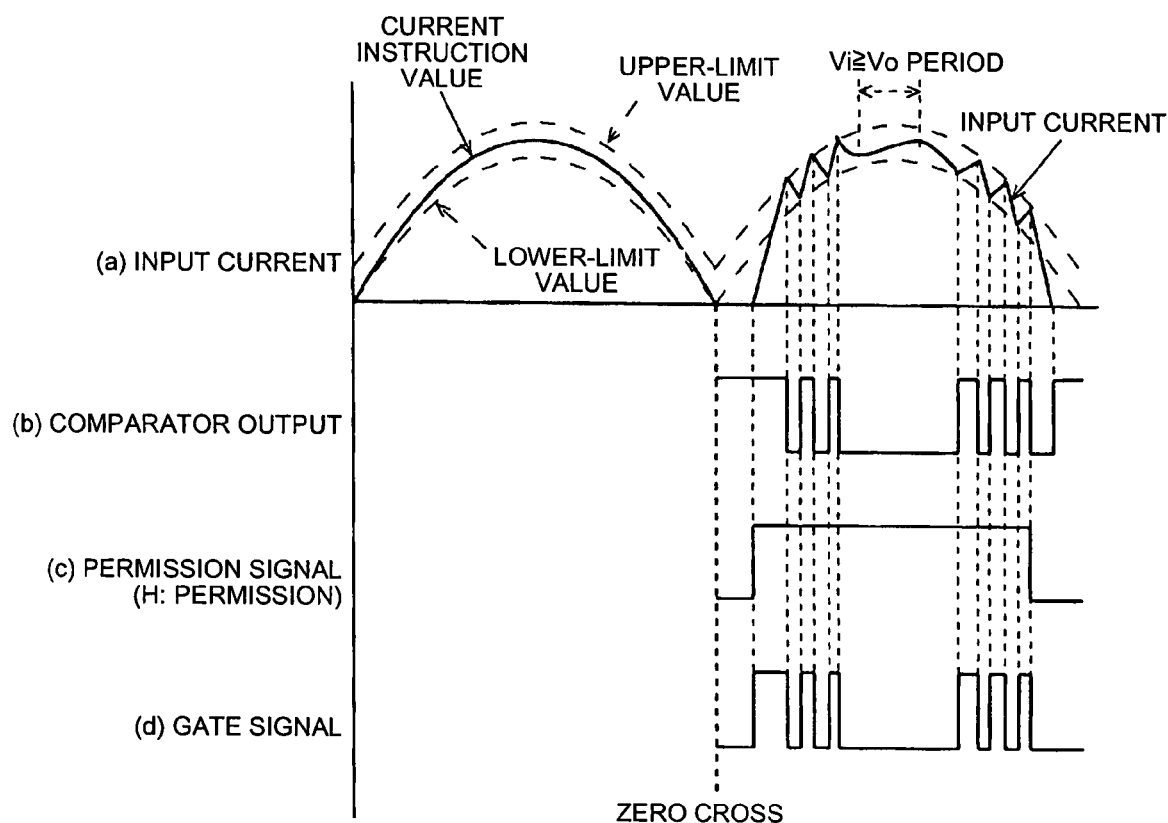
FIG. 25 is a schematic waveform chart for explaining an operation of the conventional power supply device.
Figure 26:
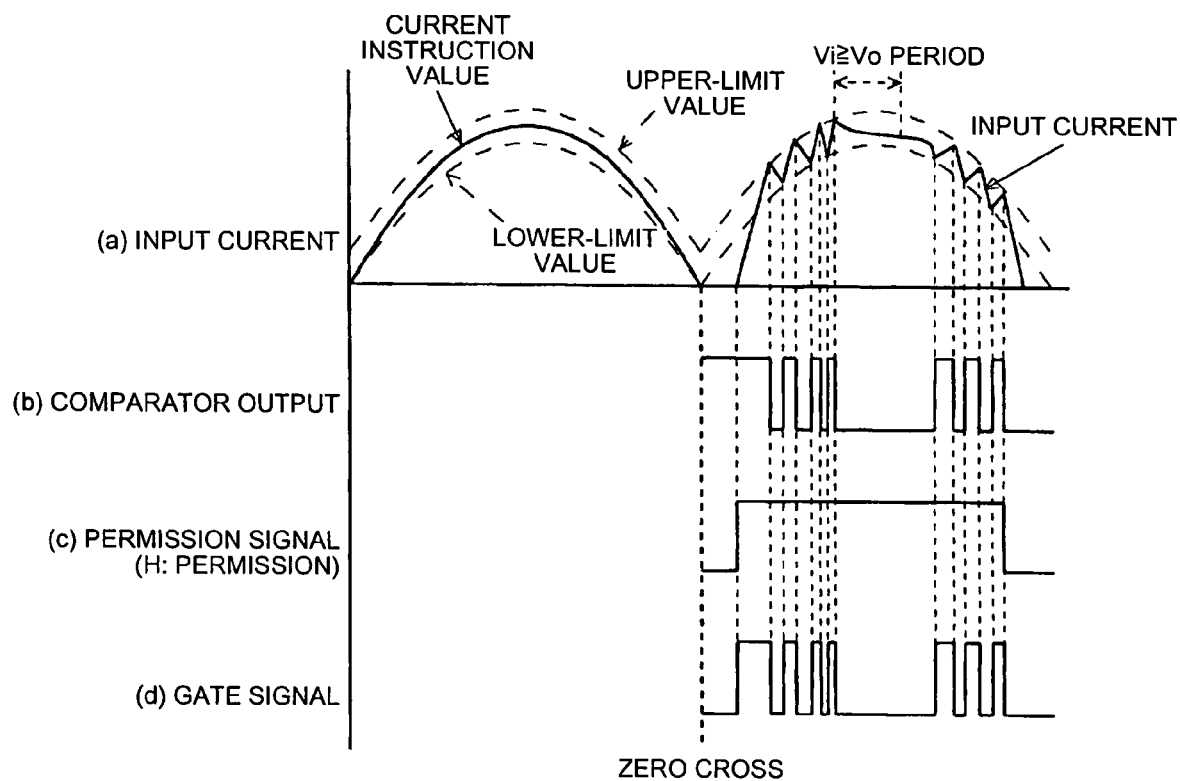
FIG. 26 is another schematic waveform chart for explaining the operation of the conventional power supply device.

Exemplary embodiments of the present invention are explained in detail below with reference to FIGS. 1 to 4. In FIGS. 1 and 2, some of the constituent elements that are the same as, or are considered to be the equivalents of, the constituent elements shown in FIGS. 23 and 24 will be referred to by using the same reference characters, and overlapping explanation thereof will be omitted. FIG. 3(a) corresponds to FIGS. 25(a) and 26(a).

First Embodiment

A power supply device shown in FIG. 1 includes: an input-current detecting unit 10 that is operable to detect an input current Ii of the voltage-boosting chopper circuit 3, based on a detection signal from the current sensor (for example, a current transformer [CT]) 6; an input-voltage detecting unit 11 that is operable to detect an input voltage Vi of the voltage-boosting chopper circuit 3; an output-voltage detecting unit 12 that is operable to detect an output voltage Vo of the voltage-boosting chopper circuit 3; and a control unit 13 that is made of, for example, a microcomputer and outputs, to the driving unit 7, a signal to switch on and off the switching element 3c of the voltage-boosting chopper circuit 3, based on the detected values and zero-cross detection of an AC power supply performed by the power-supply phase detecting circuit 5. Other parts of the power supply device are the same as those shown in FIG. 23. Thus, the explanation thereof will be omitted.

An operation of the power supply device configured as above will be explained, with reference to a current control block diagram shown in FIG. 2 and a waveform chart and a time chart shown in FIG. 3.

The control unit 13 generates a signal (a switching signal) to switch on and off the switching element 3c, based on a deviation between an output-voltage instruction value (an applied-voltage instruction value for the load 4) and the output voltage Vo. In this situation, a pulse counter 13a is reset when a zero-cross point of the input power supply waveform is detected according to a detection signal from the power-supply phase detecting circuit 5, and the operation of the switching element 3c is prohibited when the pulse counter 13a has reached a predetermined count value.

As shown in FIG. 2, at first, the calculating unit 8a calculates the deviation between the output-voltage instruction value and the voltage Vo detected by the output-voltage detecting unit 12. Based on the calculated deviation, the current-reference-signal amplitude generating unit 8b generates an amplitude value of the input-current reference signal (an amplitude value having a sinusoidal waveform and being used as a so-called reference).

The multiplying unit 8c multiples the generated amplitude value by the voltage Vi detected by the input-voltage detecting unit 11. A hysteresis is generated based on the result of the multiplication, i.e., the input-current reference signal. As the detected voltage Vi, an input voltage waveform or an absolute value of the input voltage waveform may be used.

The hysteresis comparator 8d compares the value of the input-current reference signal having the hysteresis and the input current Ii detected by the input-current detecting unit 10. Based on the result of the comparison, the switching signal for the switching element 3c is generated. The voltage boosting copper circuit 3 is controlled based on the switching signal. In other words, like in the conventional example, the switching operation is performed on the switching element 3c by using a reference current reference signal as a reference sinusoidal waveform, so that an input current waveform is obtained (see FIG. 3(a)).

On the other hand, the pulse counter 13a is reset by a reset signal being the detected power supply phase signal (zero cross) from the power-supply phase detecting circuit 5. A logical AND unit (an AND circuit) 8f performs a logical AND operation between an output signal from the pulse counter 13a and the switching signal obtained by the hysteresis comparator 8d. A switching signal obtained as a result of the logical AND operation is output to the driving unit 7.

As shown in FIG. 3, the pulse counter 13a counts the number of times the switching operation is performed on the switching element 3c (see FIG. 3(e)). The output from the pulse counter 13a gets to an H level when the pulse counter 13a is reset. The output gets to an L level when the count value has reached a predetermined value (a pulse set value) that has been set in advance (see FIG. 3(f)). As the predetermined value for the pulse counter 13a, a pulse count value that includes an interval near a peak zone (Vi≧Vo) of the input current Ii and corresponds to, for example, within 90 degrees of the power supply phase is empirically obtained.

In this situation, when a zero cross is detected, the switching element 3c is switched on (see FIGS. 3(b) and 3(c)), and after that, the input current Ii increases. When the input current Ii has reached the upper-limit value, the switching element 3c is switched off (see FIGS. 3(a) and 3(c)), and the pulse counter 13a is incremented (see FIGS. 3(d) and 3(e)). By switching on and off the switching element 3c in this manner, the input current Ii is arranged to have a sinusoidal waveform.

As described above, the switching operation of the switching element 3c is prohibited in an interval near where the input voltage Vi is larger than the output voltage Vo (near a peak zone of the input current Ii), in other words, in and after the area where the fluctuations in the input voltage Vi and the output voltage Vo or the fluctuations in the load 4 become larger.

Thus, up to the vicinity of the peak zone of the input current Ii, the current control is exercised by performing the switching operation to cause the input current waveform to have a sinusoidal waveform and to reduce hi-order harmonics. In and after the peak zone, the switching operation is prohibited so that the number of times the switching operation is performed in each half cycle of the AC power supply is inhibited from fluctuating (so that the number of times is constant). With this arrangement, it is possible to stabilize the current control, and also to easily comply with the power supply harmonic regulation.

In the description above, the switching operation of the switching element 3c is started at a time when the zero cross is detected. However, it is acceptable to use a predetermined positive value (later time) or a predetermined negative value (earlier time) with respect to the zero-cross detection point. In this situation, it is preferable to have an arrangement in which the predetermined positive value or the predetermined negative value is changed according to the level of the load 4 or the level of the input current Ii. For example, it is preferable to have an arrangement in which the larger the level of the load 4 or the level of the input current Ii is, the earlier the starting time is, while the smaller the size/level is, the later the starting time is. It is also preferable to adjust the width of the range defined by the upper-limit value and the lower-limit value.

It is a good idea to change the predetermined value, based on the power supply frequency (e.g. 50 hertz [Hz] or 60 Hz), the level of the input voltage or the input current, the level of the output voltage, and the load. It is also preferable to apply these factors individually or in combinations. Further, it is preferable to change the predetermined value depending on the use environment of the power supply device and a device with which the power supply device is used.

One reason can be explained as follows: The harmonic characteristic of the power supply changes depending on the level of the input current and the power supply frequency. Thus, the number of times the switching operation is performed is an important parameter in achieving the effect of suppressing harmonics. Consequently, by changing the number of times the switching operation is performed according to the harmonic characteristic, it is possible to enhance the effect of suppressing harmonics. Another reason can be explained as follows: when there is leeway in terms of the power supply harmonic regulation value, by reducing the number of times the switching operation is performed, it is possible to achieve the effect of improving the power factor with regard to a switching loss and a reactor loss.

To change the number of times the switching operation is performed, for example, if the number of times the switching operation is performed is five when the input current is equal to or larger than 7 amperes, the number of times the switching operation is performed is changed when the input current is equal to or smaller than 6 amperes. In this situation, the number of times the switching operation is performed is changed to eight if the AC power supply is at 50 hertz, and is changed to seven if the AC power supply is at 60 hertz.

As explained in the conventional example, it is optimal to use a motor connected via an inverter as the load 4. In this situation, it is preferable to set the starting time for the switching operation and the predetermined value to values calculated according to the number of revolutions of the motor or the frequency of the inverter. With the arrangement described above, it is possible to make the input current waveform closer to a sinusoidal waveform and to stabilize the current control.

In addition, it is also acceptable to employ a detecting unit that is operable to detect the input power supply voltage so that the predetermined value is changed according to the level of the input power supply voltage. The parameters used for setting the predetermined value may vary depending on the power supply environment and a device to be used together.

Second Embodiment

Figure 4:
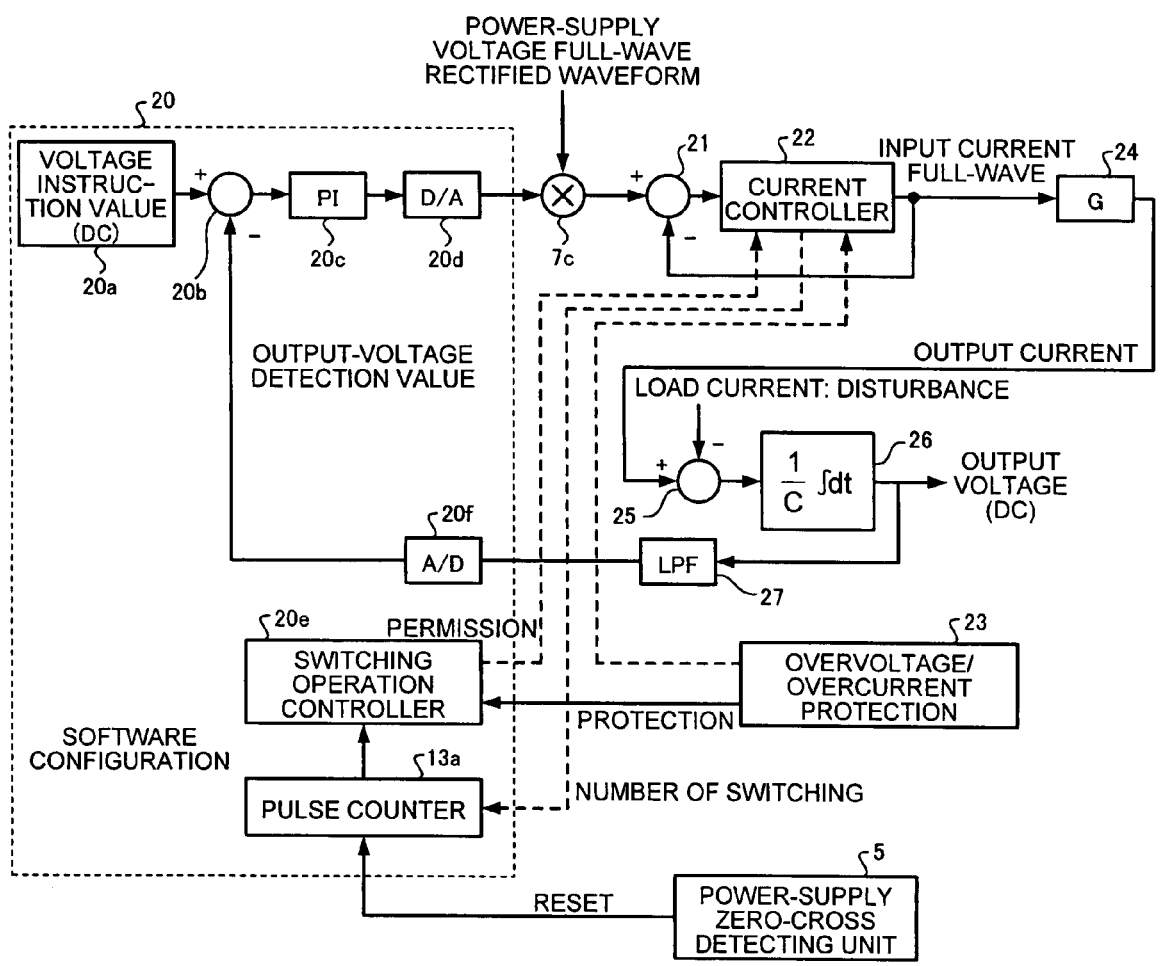
FIG. 4 is a schematic block diagram of a processing system included in the control unit.

By configuring the switching control of the switching element 3c described above with software, for example, by employing a configuration shown in a converter block diagram in FIG. 4, it is possible to make a power factor controller (PFC) universally compatible.

In this situation, loops that do not require high-speed control, such as the loop for the voltage control, are configured with the software. The current controller corresponds to a switching operation control unit that is a power system main circuit including the hysteresis comparator 8d, the logic circuit 8f, the driving unit (the gate driving circuit) 7, and the switching element (IGBT) 3c that are shown in FIG. 2.

A software configuration 20 is realized with the microcomputer serving as the control unit 13. First, a calculating unit 20b calculates a deviation between a voltage instruction value 20a determined according to the power supply environment and the device being used together and an output-voltage detection value. Based on the calculated deviation, a proportional-integral (PI) controller 20c included in the current-reference signal amplitude generating unit 8b calculates a proportional term P, and also calculates an integral term I. Based on the proportional term P and the integral term I that have been calculated, a current instruction amplitude value is calculated.

A D/A converting unit 20d converts the current instruction amplitude value into an analog output signal and outputs the analog output signal to a multiplying unit 7c. As described above, the current control is exercised based on a result of the multiplication performed by the multiplying unit 7c.

To exercise the current control, a deviation between the current instruction value and an output current value is calculated by a calculating unit 21 and input to a current controller 22, so that the operation described above is performed. The software configuration 20 includes the pulse counter 13a and a switching operation controller 20e. The pulse counter 13a starts the counting operation when having received a reset signal from the power-supply phase detecting circuit (zero cross) 5.

The switching operation controller 20e monitors the count value of the pulse counter 13a by checking to see if the count value has reached a predetermined value determined based on the parameters that correspond to the power supply environment and the device being used together. The switching operation controller 20e also outputs, to the current controller 22, a switching permission signal (see FIG. 3(f); H level) for the switching element 3c until the count value of the pulse counter 13a reaches the predetermined value.

The current controller 22 switches on and off the switching element 3c so that the input current Ii falls in the range defined by the upper-limit value and the lower-limit value. The current controller 22 also outputs information related to the number of times the switching operation is performed to the pulse counter 13a.

When the count value of the pulse counter 13a has reached the predetermined value, the switching operation controller 20e that has been monitoring the count value causes the permission signal to be at an L level to prohibit the switching operation of the switching element 3c. Due to the permission signal at the L level, the current controller 22 stops the operation of switching on and off the switching element 3c.

On the other hand, an input current full-wave obtained by the operation of the current controller 22 is fed back to the calculating unit 21 and is also converted into an output current by using a function G 24 in a system in which the power supply device is installed. A load current due to disturbance is incorporated into the output current by a calculating unit 25. After that, the output current is integrated by an integrating unit 26 to obtain an output voltage.

The output voltage is used as a power supply voltage of the load 4. Also, after noise is eliminated by a low-pass filter (LPF) 27, the output voltage is fed back to the software configuration 20. An A/D converting unit 20f converts the output voltage received as the feedback into the output-voltage detection value used by the calculating unit 20b.

To protect the power supply device, an overvoltage/overcurrent protecting unit 23 outputs overvoltage and overcurrent protection information to the switching operation controller 20e and the current controller 22, so that a protection operation, which is publicly known, is performed.

As explained above, when the software configuration 20 is used, it is possible to exercise the switching control of the switching element 3c appropriately by using the parameters corresponding to various states. It is also possible to keep the cost of the power supply device (the hardware) from increasing.

Third Embodiment

In the description of a third embodiment of the present invention, some of the elements that are the same as those in the embodiments described above will be referred to by using the same reference characters, and the explanation thereof will be omitted.

An example of a power factor improving and harmonic current suppressing unit uses the method explained in the first embodiment or the second embodiment above. When this method is used, the current control is stabilized by performing the switching operation a small number of times, and it is therefore possible to easily comply with the power supply harmonic regulation. More specifically, the power supply is short-circuited via the reactor by using the voltage-boosting chopper circuit as shown in FIG. 1, so that it is possible to exercise control and cause the input current waveform to have an arbitrary waveform. By using the control structure as shown in FIG. 2, the switching element is switched on and off so that the input current waveform has the power-supply voltage waveform. Also, the switching operation is prohibited after the number of times the switching operation is performed has reached a predetermined value, to exercise control while the input current is stabilized (see the waveform shown in FIG. 3).

When this method is used, however, the input current waveform is easily affected by fluctuations related to parts, for example, fluctuations in the inductance value of the reactor and fluctuations in the hysteresis width (the range defined by the upper-limit value and the lower-limit value) due to fluctuations in the resistance value. For example, when the output load voltage and the number of times the switching operation is performed both remain the same, the operation is performed in such a manner that the current instruction values are different between when the hysteresis width is narrow and when the hysteresis width is wide. Thus, as shown in FIGS. 5(a) and 5(b), the current waveforms are different from each other. Also, when the reactor inductance values are mutually different, the current waveforms are mutually different, too. When there is a difference between waveforms, the harmonic currents are largely affected, and in some situations, the harmonic currents may exceed the power supply harmonic regulation value.

On the other hand, even if the current hysteresis width and the reactor inductance value both remain the same, when the switching operation is performed in situations having mutually different power supply voltages, because the current gradients obtained when the switching element is short-circuited and released are different from each other, the current waveforms are also mutually different even in regions where the rated power supply voltages are mutually different. To obtain a power supply that is universally compatible with and with which it is necessary to anticipate a large range of power supply voltage fluctuations, it is required to suppress the power supply harmonics within a range from 100V−10% (domestic) to 240V+10% (overseas), for example. Thus, when the conventional technique is used, it is difficult to cope with the fluctuations related to the parts.

With regard to power supply harmonics, the International Electrotechnical Commission (IEC) standards specify limit values of harmonic currents for each harmonic order, up to harmonic order 40. Because it is difficult to express evaluation of harmonics in an integrated manner, a value called a harmonic evaluation index, Ymax, will be used in the explanation below.

When an n-order harmonic component of an input current is expressed as In, while a limit value for the n-order harmonic is expressed as Isn, values that are standardized by the limit values can be expressed as I2/Is2, I3/Is3, I4/Is4, . . . In/Isn, . . . I40/Is40. Each of these values denotes a ratio of the harmonic component to the limit value.

Among these, when a maximum value is expressed as Ymax where Ymax=(I2/Is2, I3/Is3, I4/Is4, . . . In/Isn, . . . I40/Is40), the harmonics are not compliant with the standard when Ymax>1 is satisfied, whereas the harmonics are compliant with the standard when Ymax≦1 is satisfied.

As explained above, the situation in which Ymax>1 is satisfied is caused by, for example, fluctuations related to the parts such as fluctuations in the inductance value of the reactor and fluctuations in the hysteresis width (the range defined by an upper-limit value and a lower-limit value) due to fluctuations in the resistance value, and differences in the power supply voltage. As a result, according to conventional techniques, it has been difficult to comply with the power supply harmonic regulation values.

It is an object of the third embodiment to exercise control to be compliant with the power supply harmonic regulation, without being easily affected by the fluctuations related to the parts and fluctuations in the power supply, and also to improve the power factor while performing the switching operation a small number of times.

Figure 7:
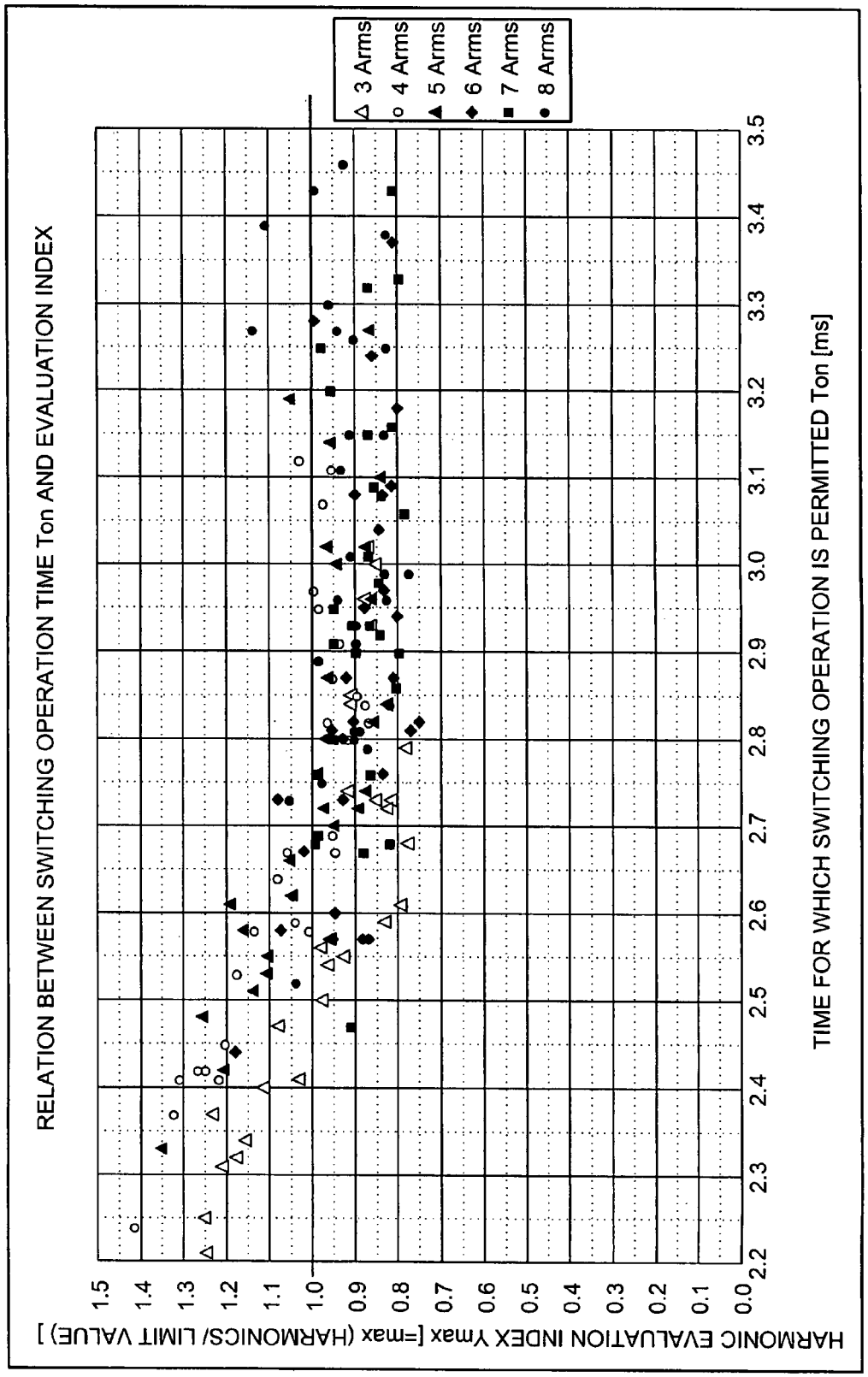
FIG. 7 is a chart of Ton-Ymax characteristics.

When a time during which the switching permission signal shown in FIG. 3 is in a permission state is expressed as Ton, we have observed that Ton-Ymax characteristics are as shown in FIG. 7, while the input current, the power supply voltage, the reactor inductance, the current hysteresis width, and how many times the switching operation is performed on the switching element 3c are used as parameters. As shown in FIG. 7, the results show that Ymax≦1 is satisfied when Ton is in a range from 2.75 milliseconds to 3.1 milliseconds.

Figure 8:
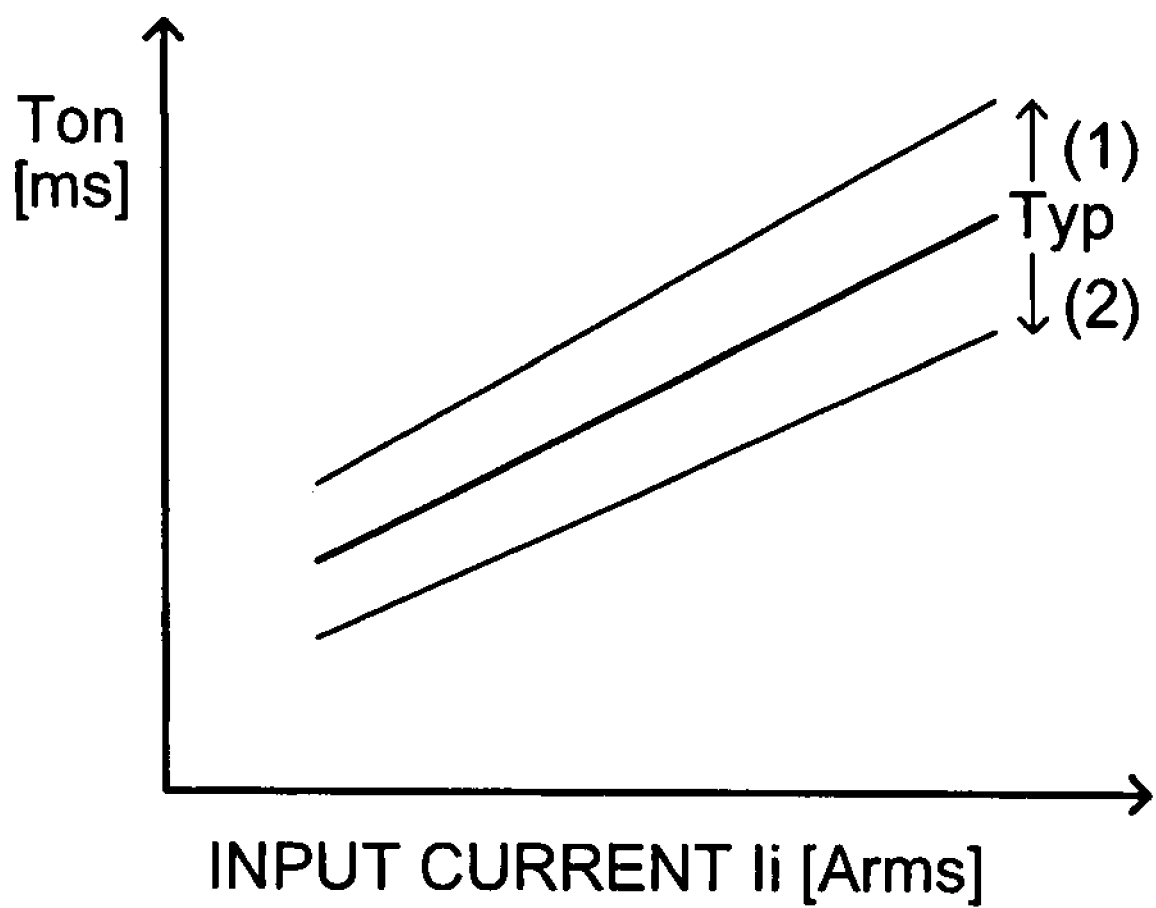
FIG. 8 is a chart for explaining a relation between an input current and Ton.

However, the input current and Ton have a relation as shown in FIG. 8. When the reactor inductance is large, and/or the current hysteresis width is wide, and/or the number of times the switching operation is performed is large, and/or the power supply voltage is small, the value of Ton becomes large and shifts toward (1) shown in the chart. Conversely, when the reactor inductance is small, and/or the current hysteresis width is narrow, and/or the number of times the switching operation is performed is small, and or the power supply voltage is large, the value of Ton becomes small and shifts toward (2) shown in the chart. Thus, according to conventional techniques, it has been difficult to set Ton to such a value that satisfies Ymax≦1.

To cope with this situation, the third embodiment provides a power supply device that automatically adjusts the number of times the switching operation is performed on the switching element 3c so that the Ton value is within the predetermined range, to be compliant with a universal power supply voltage range even if there are fluctuations in the reactor inductance value and fluctuations in the current hysteresis width.

The power supply device according to the third embodiment increases the number of times the switching operation is performed on the switching element 3c when Ton expressing the time during which the switching permission signal is on (shown in FIG. 3) is smaller than a first predetermined value that is 2.75 (shown in FIG. 7) and decreases the number of times the switching operation is performed on the switching element 3c when the time Ton is larger than a second predetermined value that is 3.10. The number of times the switching operation is performed on the switching element 3c remains the same when Ton expressing the time during which the switching permission signal is on is equal to or larger than the first predetermined value (2.75) and also equal to or smaller than the second predetermined value (3.10).

In FIG. 7, Ymax values are plotted while Ton values are expressed on the x-axis, the Ymax values having been measured while the values of the parameters shown in FIG. 6 are varied. When Ymax>1 is satisfied, the harmonics are not compliant with the IEC standard. Thus, it is shown in FIG. 7 that the IEC standard is met, if Ton is controlled within such a range (defined by an upper-limit value from 3.05 milliseconds to 3.10 milliseconds and a lower-limit value around 2.8 milliseconds) that always satisfies Ymax≦1, by changing the number of times the switching operation is performed on the switching element 3c, with respect to an arbitrary reactor and an arbitrary current hysteresis width that are within the range shown in FIG. 6.

Figure 9:
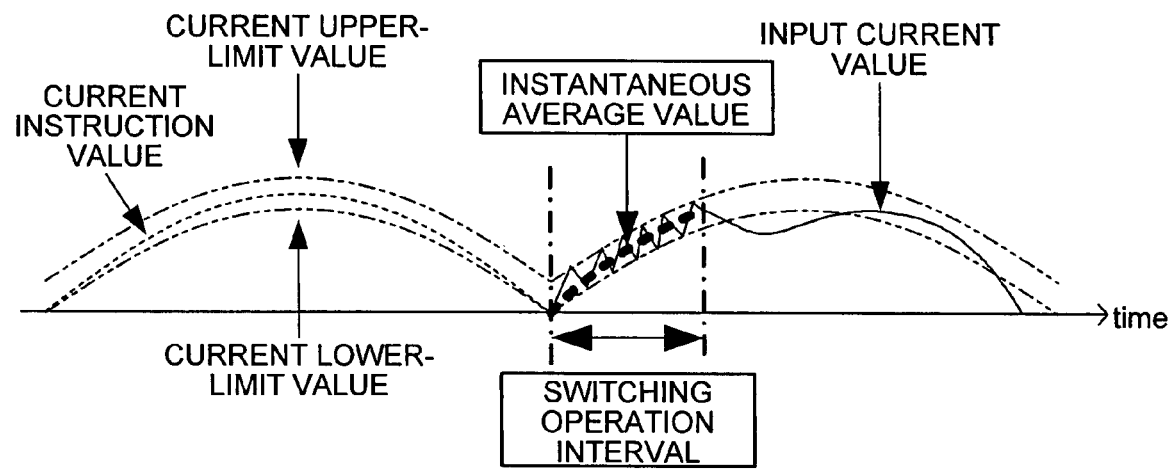
FIG. 9 is a chart for explaining an example of the number of times the switching operation is performed, when a current hysteresis width is narrow in the power supply device.
Figure 10:
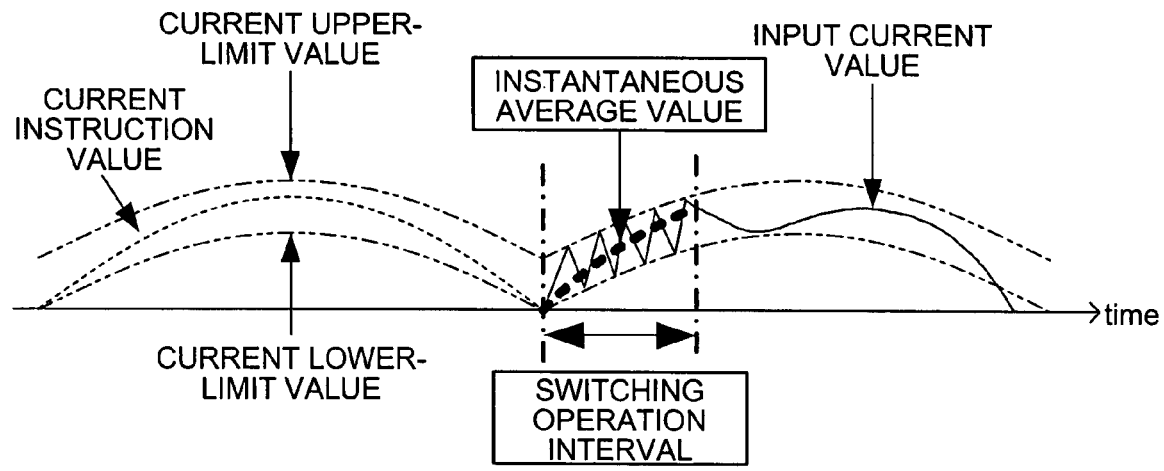
FIG. 10 is a chart for explaining an example of the number of times the switching operation is performed, when the current hysteresis width is wide in the power supply device.

Accordingly, it means that the number of times the switching operation is performed needs to be changed so that instantaneous average values during an interval in which the switching operation is performed are equal to one another regardless of the current hysteresis width. For example, as shown in FIGS. 9 and 10, the number of times the switching operation is performed on the switching element 3c is set to 6, when the current hysteresis width is narrow, whereas the number of times is set to 5, when the current hysteresis width is wide.

More specifically, shown in FIG. 7 are the Ton-Ymax characteristics that are observed when the parameters are varied while the fluctuations related to the parts such as the fluctuations in the inductance value of the reactor and the fluctuations in the hysteresis width due to the fluctuations in the resistance value are taken into consideration. Thus, by changing the number of times the switching operation is performed according to the results shown in FIG. 7 and exercising control so that Ton is in such a range that always satisfies Ymax≦1, it is possible to comply with the power supply harmonic regulation value even if there are fluctuations related to the parts.

Furthermore, because the characteristics shown in FIG. 7 correspond to a situation in which the power supply frequency is 50 hertz, it is possible to apply the results to a situation in which the power supply frequency is 60 hertz by replacing the temporal axis of Ton with a power supply phase axis. With this arrangement, it is possible to make the power supply universally compliant. Consequently, it is possible to exercise control to be compliant with the power supply harmonic regulation, without being easily affected by the fluctuations related to the parts and by the fluctuations in the power supply (differences in the power supply voltage).

Figure 11:
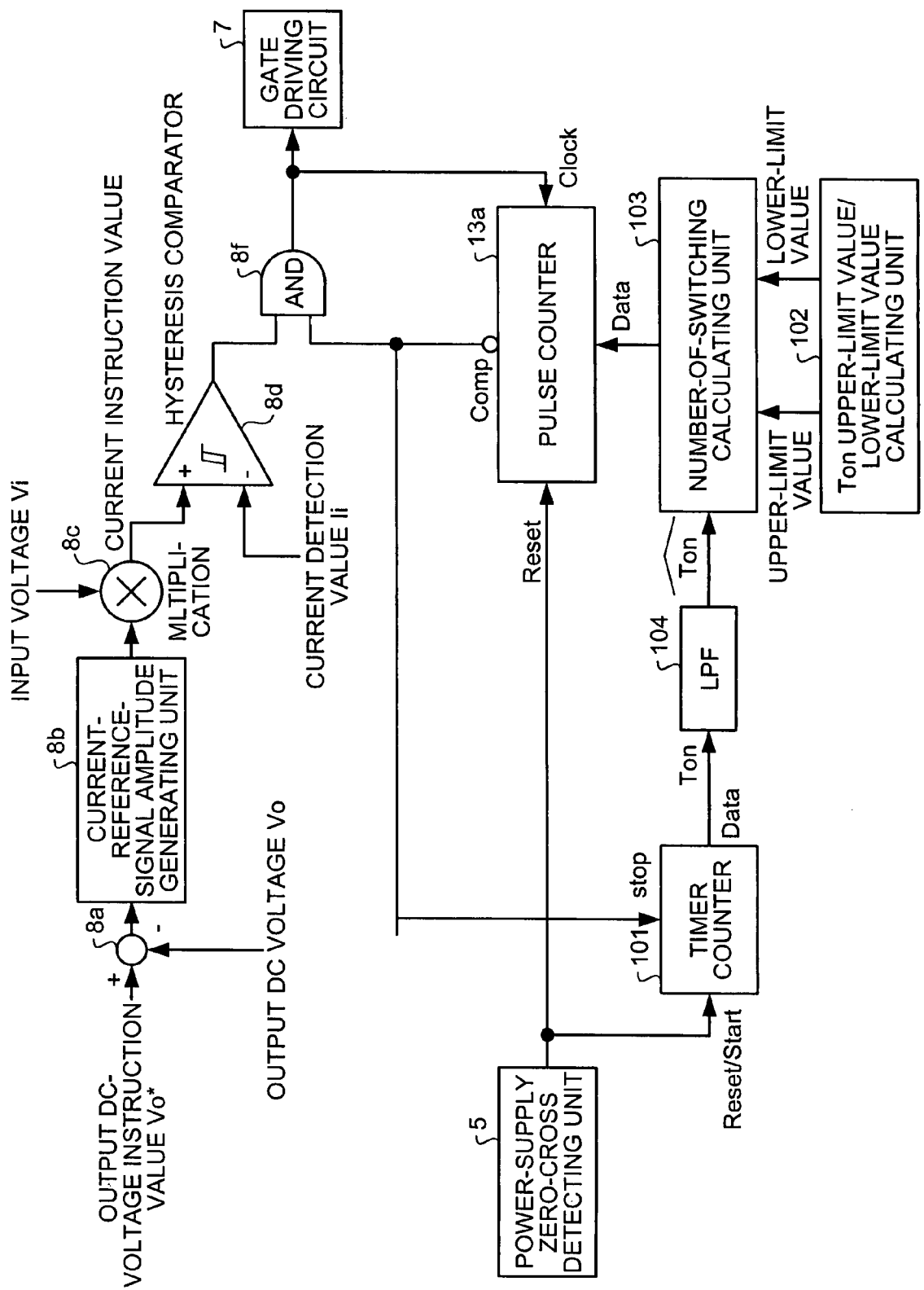
FIG. 11 is a block diagram of a configuration example of a relevant part according to a third embodiment of the present invention.

More specifically, as shown in FIGS. 11 and 3, a Ton upper-limit value/lower-limit value calculating unit 102 outputs values (an upper-limit value and a lower-limit value) of the Ton time that satisfy Ymax≦1, based on FIG. 7. In the present example, a situation in which the upper-limit value is set to 3.1 milliseconds whereas the lower-limit value is set to 2.75 milliseconds will be explained. As explained below, it is acceptable to change the upper-limit value and the lower-limit value for the time Ton, depending on conditions such as a level of the input current. In that situation, the Ton upper-limit value/lower-limit value calculating unit 102 calculates optimal upper and lower-limit values based on the conditions such as the level of the input current.

The pulse counter 13a and a timer counter 101 are reset by a reset signal being the detected power supply phase signal (zero cross) from the power-supply zero-cross detecting unit 5. As a result, the timer counter 101 starts measuring a time Ton. The pulse counter 13a counts the number of times the switching operation is performed on the switching element 3c. When the counter value has reached a predetermined value (the pulse set value, which is 5 in the present example) that has been set in advance, the output from the pulse counter 13a (indicated as (f) in FIG. 3) gets to the L level. Accordingly, the timer counter 101 stops measuring the time Ton. Thus, the timer counter 101 outputs a value of the time Ton obtained when the switching operation has been performed five times. In the present example, let us assume that the value of the time Ton obtained at this time is 2.70 milliseconds.

On the other hand, the Ton upper-limit value/lower-limit value calculating unit 102 outputs the upper-limit value (3.10 milliseconds) and the lower-limit value (2.75 milliseconds) to a number-of-switching calculating unit 103. The number-of-switching calculating unit 103 compares the time Ton with the upper and lower-limit values. In this example, because the time Ton is shorter than the lower-limit value, the pulse set value that has been set to the pulse counter 13a is incremented by 1 (changed to 6 times in the present example). As a result, in the next cycle (zero cross), the time Ton becomes longer because the pulse counter value is changed to 6. Consequently, the control is exercised with such a tendency that makes the time Ton longer than the lower-limit value.

On the contrary, when the number-of-switching calculating unit 103 compares a time Ton with the upper and lower-limit values, if the time Ton is longer than the upper-limit value, the pulse set value that has been set to the pulse counter 13a is decremented by 1 (changed to 4 times in the present example). As a result, in the next cycle (zero cross), the time Ton becomes shorter because the pulse counter value is changed to 4. Consequently, the control is exercised with such a tendency that makes the time Ton shorter than the upper-limit value.

As explained above, the number-of-switching calculating unit 103 compares the time Ton with the upper and lower-limit values. The pulse set value that has been set to the pulse counter 13a is incremented or decremented by 1, based on the result of the comparison. As a result, the time Ton is arranged to fall within the range defined by the upper-limit value and the lower-limit value thereafter. Consequently, by exercising control so that Ton is in such a range that always satisfies Ymax≦1 according to the results shown in FIG. 7, it is possible to comply with the power supply harmonic regulations even if there are fluctuations related to the parts.

As explained above, the number-of-switching calculating unit 103 compares the switching permission signal time Ton that corresponds to the output from the pulse counter 13a and has been detected by the timer counter 101 with the upper-limit value (3.10 in FIG. 7) and the lower-limit value (2.75 in FIG. 7) calculated by the Ton upper-limit value/lower-limit value calculating unit 102, so that the counter data of the pulse counter 13a is set based on the result of the comparison. The switching operation is performed on the switching element 3c (see FIG. 1) the specified number of times that has been set to the pulse counter 13a.

In the example described above, when the number of times the switching operation is performed is changed, the input current waveform is caused to be in a transient state. Thus, it is desirable to make the changing cycle a number of seconds, which is slower than the power supply cycle and also to perform a filtering process on the time Ton by using a low-pass filter 104.

In addition, it is acceptable to change the upper and lower-limit values for the time Ton depending on the level of the input current (to make the upper-limit value smaller than the range from 3.05 milliseconds to 3.10 milliseconds and to make the lower-limit value larger than around 2.8 milliseconds). By changing the upper and lower-limit values depending on the level of the input current, it is possible to maintain the power factor at a high level whether the load is light or heavy. For example, when the load is light, by setting the upper-limit value to, for example, 2.9 milliseconds, which is smaller than the range from 3.05 milliseconds to 3.10 milliseconds, so that the number of times the switching operation is performed on the switching element 3c becomes smaller, it is possible to make the switching loss smaller. Conversely, when the load is heavy, by setting the lower-limit to, for example, 2.9 milliseconds, which is larger than around 2.8 milliseconds, it is possible to improve the power factor.

Fourth Embodiment

A fourth embodiment of the present invention are explained below with reference to FIGS. 12 to 18.

The fourth embodiment is obtained by combining an invention described in another application (Japanese Patent Application No. 2004-6982) filed by the present applicant and the third embodiment described above. Some of the characteristics in the contents of the application (Japanese Patent Application No. 2004-6982) that are specific to the fourth embodiment will be explained below.

In the example described above, the output DC-voltage Vo is an important parameter for the input current waveform and the harmonic currents. Thus, when the output DC-voltage Vo fluctuates, the input current in the current control is affected. In other words, the harmonic current characteristic and the power factor improvement characteristic will vary depending on what device the power supply device is installed on. Thus, a problem arises where the adaptability of the power supply device becomes low.

In the power supply device described above, it is useful to perform the voltage feedback control by using software in a microcomputer, in view of the costs and the like. In that situation, one possibility is to detect the output DC-voltage Vo by employing a voltage-dividing resistor circuit that divides the output DC-voltage Vo, so that an AD-conversion is performed on an output from the voltage-dividing resistor circuit.

However, the detected value of the output DC-voltage Vo may have an error (in other words, the detected value may be higher or lower than the actual value), due to fluctuations in the resistance value of the voltage-dividing resistor circuit and fluctuations in an A/D converter reference voltage AVR that is required in the AD-conversion process. Thus, when the output DC-voltage Vo that is fed back contains an error, there will be fluctuations in the output voltage.

The fluctuations related to the parts and the like are within a range of ±4% to ±6%. However, for example, when an output DC-voltage Vo of about 300 volts is detected, an error may be as large as about ±12 volts to ±18 volts. The fluctuations in the output DC-voltage Vo lead to a problem where the current control is not stable, and also the harmonic characteristic is not stable, and it is therefore not possible to comply with the power supply harmonic regulation.

The fluctuations also largely affect the input current waveform. When the power supply voltage is lowered because of an increase in the input current or when the power supply voltage is raised or lowered because of an influence from another system connection device, it becomes difficult to maintain the input current waveform to be similar to the input voltage waveform. As a result, the stability of the current control is affected.

To cope with this problem, the fourth embodiment employs the following configuration.

A power supply device according to the fourth embodiment is configured to detect, when controlling a voltage-boosting chopper circuit that includes at least a reactor, a no-load output voltage Vo(0) by using a voltage-dividing resistor circuit, an LPF, and an A/D converter for detecting the output voltage Vo(t) of the voltage-boosting chopper circuit. The power supply device also has voltage control incorporated into the current control, the voltage control corresponding to a voltage deviation Ve between A×Vo(0) obtained by multiplying the no-load output voltage Vo(0) by a predetermined ratio and a loaded output voltage Vo(t). With this arrangement, by maintaining the ratio of the loaded voltage to the no-loaded voltage at a predetermined value, it is possible to keep the loaded output voltage constant, regardless of fluctuations in the voltage dividing resistance and the A/D converter reference voltage AVR.

More specifically, according to the fourth embodiment, the ratio between the output voltage of the voltage-boosting chopper circuit and the no-load output voltage, which is expressed by Vo(t)/Vo(0), does not depend on either the voltage dividing resistance or the A/D converter reference voltage AVR.

Thus, if the ratio A (=Vo(t)/Vo(0)) is measured in advance by using a predetermined circuit, it is possible to use the ratio in any model regardless of fluctuations. Accordingly, by storing the ratio A into a table or the like in advance, it is possible to make sure that Vo(t)=AVo(0) is satisfied. Consequently, it is possible to correct the value to be a true value in any device.

EXAMPLE 1

Figure 12:
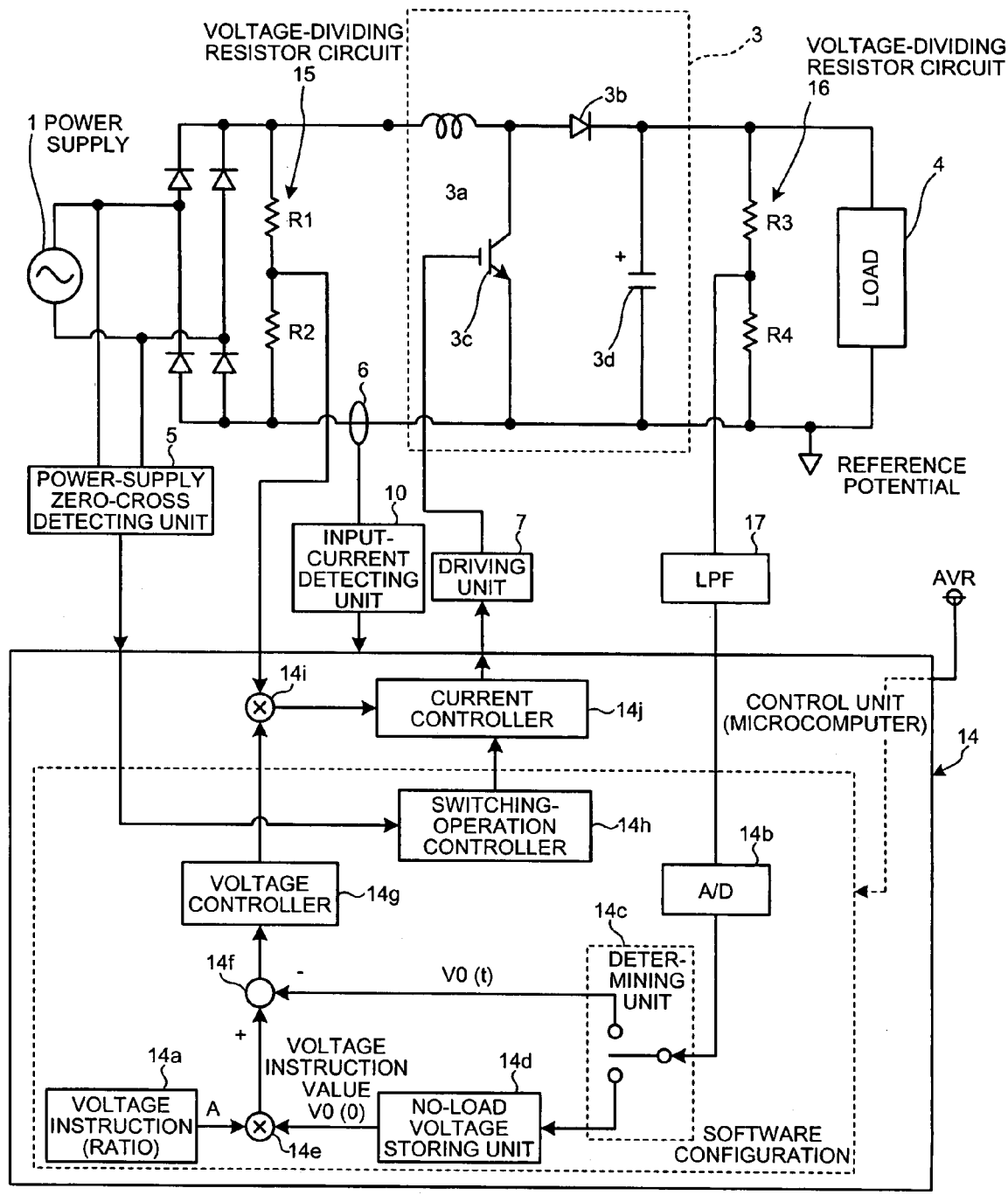
FIG. 12 is a block diagram of a configuration example according to a fourth embodiment of the present invention.

Specific examples will be explained in detail with reference to FIGS. 12 to 17. In FIG. 12, some of the constituent elements that are the same as, or considered to be the same as, those in FIG. 1 will be referred to by using the same reference characters, and overlapping explanation thereof will be omitted.

A power supply device shown in FIG. 12 includes: the input-current detecting unit 10 that is operable to detect an input current Ii of the voltage-boosting chopper circuit 3 based on a detection signal from the current sensor (e.g. a CT) 6; a voltage-dividing resistor circuit 15 that includes resistors R1 and R2 that are connected in series to detect the input voltage Vi of the voltage-boosting chopper circuit 3; and a voltage-dividing resistor circuit 16 that includes resistors R3 and R4 that are connected in series to detect the output voltage (the output DC-voltage) Vo; a Low-Pass Filter (LPF) 17 that eliminates noise; and a control unit 14 that is made of, for example, a microcomputer and is operable to detect a voltage filtered by the LPF 17 by performing an AD-conversion, and also outputs, to the driving unit 7, a signal to switch on and off the switching element 3c of the voltage-boosting chopper circuit 3, based on the detected values and a zero cross of the AC power supply 1 detected by the power-supply zero-cross detecting unit (power-supply phase detecting unit) 5.

As a modification example, another arrangement is acceptable in which the voltage-boosting choke coil (reactor) 3a and the switching element 3c that are shown in FIG. 12 are positioned to precede the rectifying circuit 2. With this arrangement, it is possible to achieve the same advantageous effect by having the voltage-boosting choke coil (reactor) 3a and the switching element 3c serve as active filters. In that situation, it is a good idea to change the positions of the current detecting unit or the like, as necessary. Also, the control unit 14 has the same function as that of the control unit 13 shown in FIG. 1, and the other elements are the same as those shown in FIG. 1. Thus, the explanation thereof will be omitted.

Figure 13:
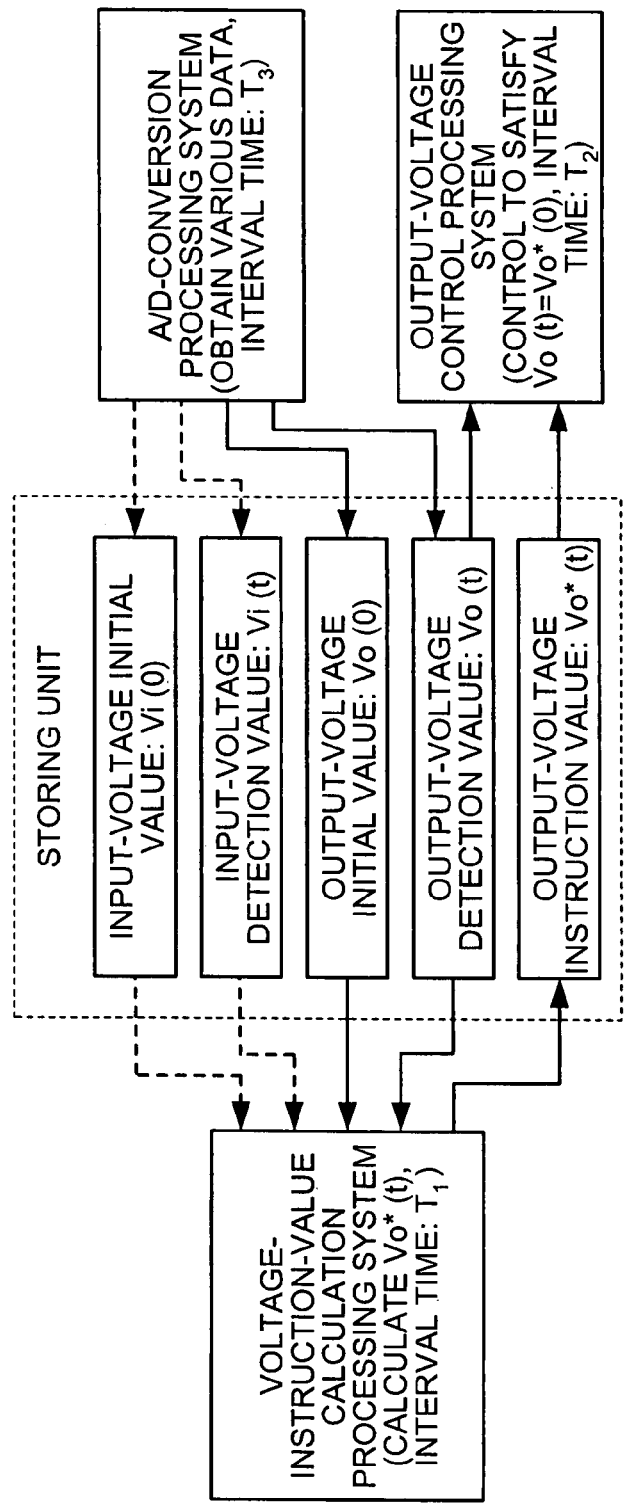
FIG. 13 is a block diagram of a processing system and the like of a control unit included in the power supply device according to the fourth embodiment.

With reference to FIG. 13 as well, the control unit 14 includes a voltage instructing unit 14a that outputs an instruction value (the ratio) A for inhibiting fluctuations in the output voltage; an A/D 14b that performs an AD-conversion and detects the output voltage Vo(t) that has been filtered through the LPF 17; a determining unit 14c that changes the output voltage Vo(t) obtained as a result of the AD-conversion so that it corresponds to a no-load state and a loaded state; a no-load voltage storing unit 14d that stores therein an output voltage Vo(0) corresponding to a no-load state; a multiplying unit 14e that multiplies the output voltage Vo(0) corresponding to a no-load state by the ratio A; a calculating unit 14f that performs a calculation on a voltage instruction value obtained as a result of the multiplication and an output-voltage detection value Vo(t) corresponding to a loaded state; a voltage controller 14g that calculates a correction amount for an input-voltage detection value Vi(t), based on a result of the calculation performed by the calculating unit 14f; and a switching operation controller 14h that generates on and off timing for the switching element 3c, based on a detection signal from the power-supply zero-cross detecting unit 5, in the same manner as in the conventional technique.

The control unit 14 also includes: a multiplying unit 14i that multiplies the input-voltage detection value Vi(t) by the calculated value obtained by the voltage controller 14g; and a current controller 14j that controls the input current Ii by having the result of the multiplication by the multiplying unit 14i incorporated, when outputting the switching signal for the switching element 3c based on the switching timing output by the switching operation controller 14h. The switching operation controller 14h and the current controller 14j may be configured as shown in a block diagram in FIG. 24.

An operation of the power supply device configured as above will be explained with reference to a processing system block diagram in FIG. 13 and flowcharts in FIGS. 14 to 16. In the same manner as according to the conventional technique, the control unit 14 causes the output voltage to be at a predetermined level required by the load 4 by performing the switching operation on the switching element 3c, based on the output-voltage instruction value (the applied-voltage instruction value for the load 4). The control unit 14 also causes the input current waveform to be a sinusoidal waveform. To improve the input AC waveform and to reduce high-order harmonic currents, the switching operation is performed on the switching element 3c a predetermined number of times based on a zero-cross point of the input power supply.

A process performed by a software configuration according to the fourth embodiment is explained below. First, as a result of the changeover by the determining unit 14c, a voltage-instruction-value calculation processing system obtains the output voltage Vo(0) corresponding to a no-load state and stores the obtained output voltage Vo(0) into the no-load voltage storing unit 14d. By using the output voltage Vo(0), the voltage-instruction-value calculation processing system obtains a voltage instruction value Vo*(t). The determining unit 14c determines whether it is a no-load state or a loaded state by checking to see if the load 4 is in operation.

The no-load output voltage is detected by creating a no-load state for a predetermined time. To detect the no-load output voltage, it is a good idea to employ a no-load determining unit described later to determine if it is a no-load state and to store or update a detected value. Also, it is preferable to use a predetermined time between when the power of the power supply device is turned on and when the load starts being activated as a no-load state and to detect the no-load output voltage during the predetermined time. Alternatively, it is also preferable to stop the operation of the load once every predetermined time by using an interval timer and to detect the no-load output voltage during the non-operation period.

Figure 14:
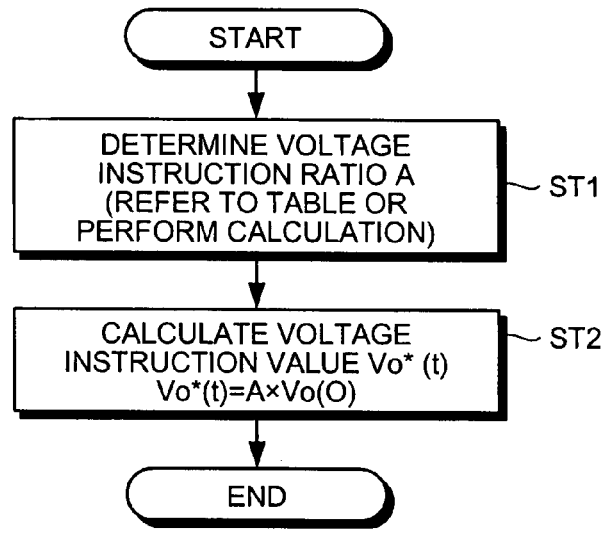
FIG. 14 is a schematic flowchart for explaining an operation of the power supply device according to the fourth embodiment.

Subsequently, as shown in FIG. 14, the ratio A is obtained by referring to a table that has been empirically prepared in advance or is calculated based on the present output voltage Vo (the output voltage Vo(t) corresponding to a loaded state) (step ST1). The ratio A is multiplied by the output voltage Vo(0) obtained in a no-load state, so that the voltage instruction value VO*(t)(=A×Vo(0)) is obtained (step ST2).

The ratio A is a value that has been calculated in consideration of compliance with the power supply harmonic regulation. Also, when the load 4 is a motor, the ratio A is calculated based on a voltage value required by a motor controlling system according to the amount of the load. Thus, the ratio A may be obtained by referring to a table or may be obtained through a calculation using a function.

Figure 15:
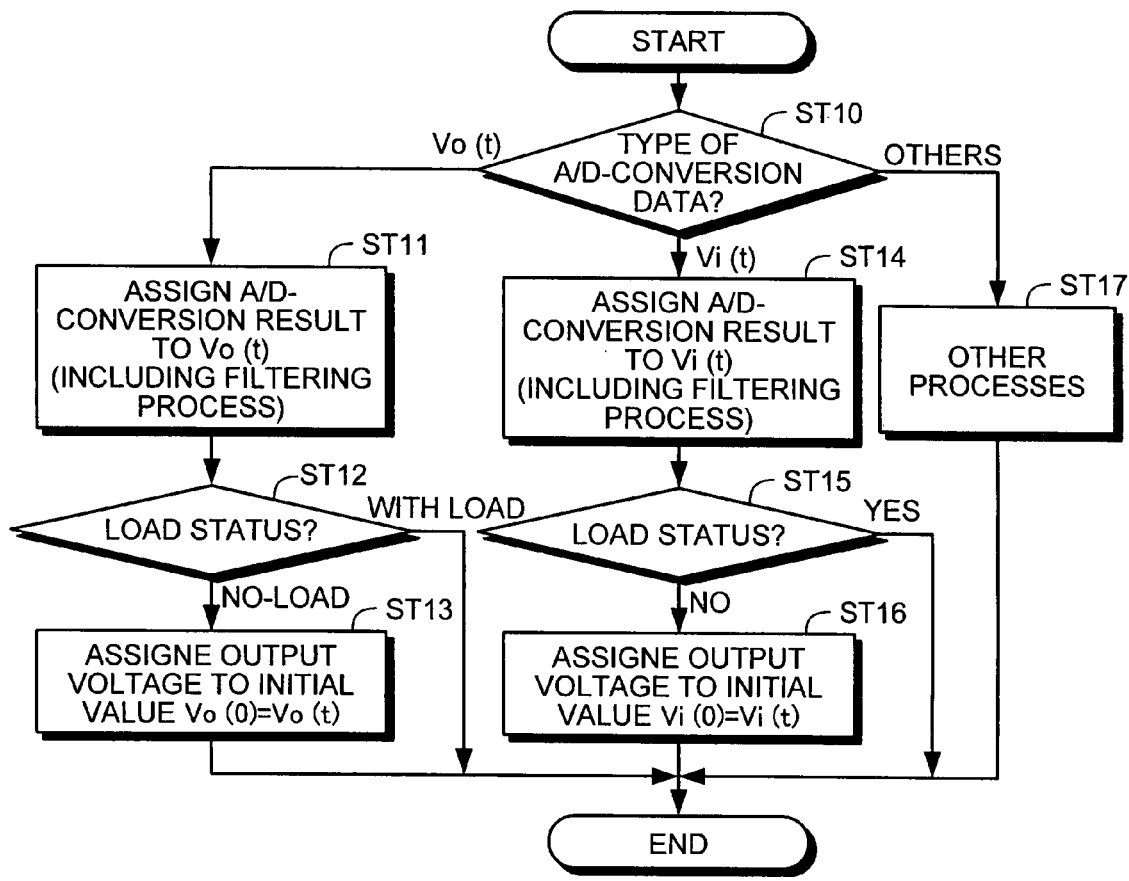
FIG. 15 is a schematic flowchart for explaining another operation of the power supply device according to the fourth embodiment.

An AD-conversion processing system that performs an AD-conversion when the output voltage or the input voltage is detected determines the type of the AD-conversion data (an output voltage or an input voltage), as shown in FIG. 15 (step ST10). When the type of the data is an output voltage, the AD-conversion processing system performs a filtering process on the result of the AD-conversion and assigns the result of the AD-conversion to Vo(t) (step ST11). Subsequently, the AD-conversion processing system determines the state of the load (step ST12). If there is a load, the output voltage Vo(t) is used as it is. If there is no load, the output voltage Vo(t) is assigned to the initial value Vo(0) (step ST13).

When the type of the data is an input voltage, the AD-conversion processing system performs a filtering process on the result of the AD-conversion and assigns the result of the AD-conversion to Vi(t) (step ST14). Subsequently, the AD-conversion processing system determines the state of the load (step ST15). If there is a load, the input voltage Vi(t) is used as it is. If there is no load, the output voltage Vi(t) is assigned to the initial value Vi(0) (step ST16). On other types of data, an appropriate process is performed (step ST17).

Figure 16:
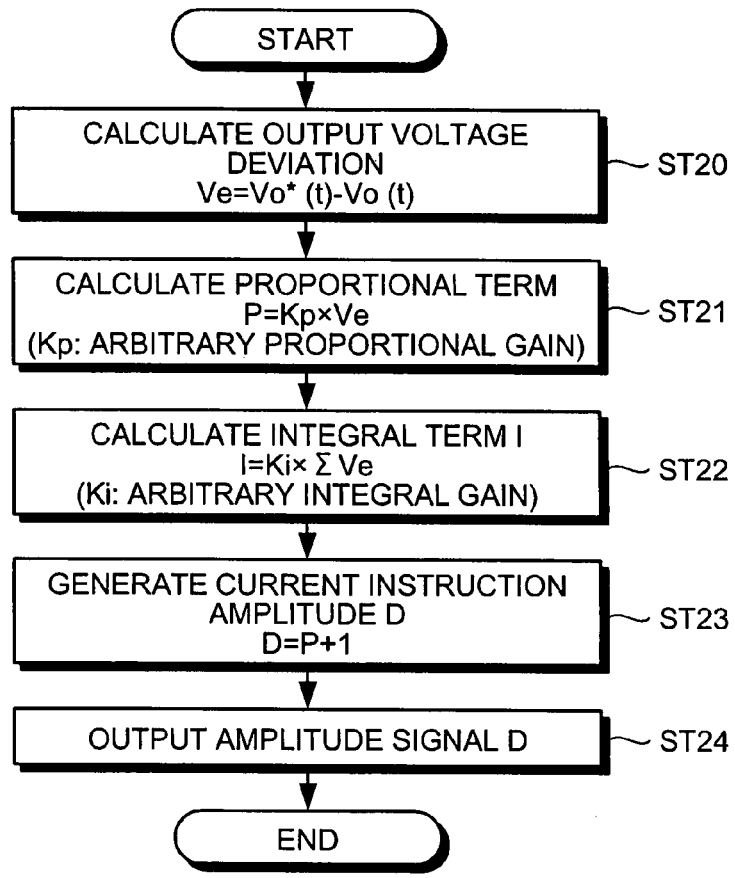
FIG. 16 is a schematic flowchart for explaining yet another operation of the power supply device according to the fourth embodiment.

In an output voltage controlling system that performs the voltage feedback control, as shown in FIG. 16, the calculating unit 14f calculates, when a PI control is exercised, a voltage deviation Ve between the voltage instruction value Vo*(t) and the output-voltage detection value Vo(t) (step ST20). For the voltage deviation Ve, a proportional term P (=Kp×Ve) is calculated. Also, an integral term I (=Ki×sigmaVe) is calculated to obtain an instruction amplitude D (=P+I) (steps ST21 through ST24). A current instruction value is obtained by using the instruction amplitude D. In the expressions above, Kp denotes an arbitrary proportional gain, whereas Ki denotes an arbitrary integral gain.

As for interval times used by the processing systems above, the basic relationship between the interval times can be expressed as below.

The interval time used by the voltage-instruction-value calculation processing system≧The interval time used by the output-voltage-control processing system≧The interval time used by the AD-conversion processing system.

As a result of the processes described above, the voltage controller 14g outputs, to the multiplying unit 14i, a multiplication value with which the input voltage Vi is to be corrected, so that when the voltage instruction value is Vo*(t), the output voltage Vo(t) is equal to Vo*(t).

With this arrangement, the output voltage and the input voltage in the processing systems are obtained by using, in common, the resistors R1 and R2 included in the voltage-dividing resistor circuit 15 and the A/D converter reference voltage AVR. Also, the voltage deviation Ve between the voltage instruction value Vo*(t) (=A×Vo(0)) and the output voltage Vo(t) corresponds to an amount in correspondence with, for example, the fluctuations in the resistors R1 and R2 included in the voltage-dividing resistor circuit 15 and the fluctuations in the A/D converter reference voltage AVR.

Consequently, during a switching interval of the switching element 3c determined by the switching operation controller 14h, the current control is performed by the current controller 14j, and also the voltage control to keep the output voltage Vo(t) constant is incorporated into the current control, by having the result of the multiplication by the multiplying unit 14i incorporated.

Figure 24:
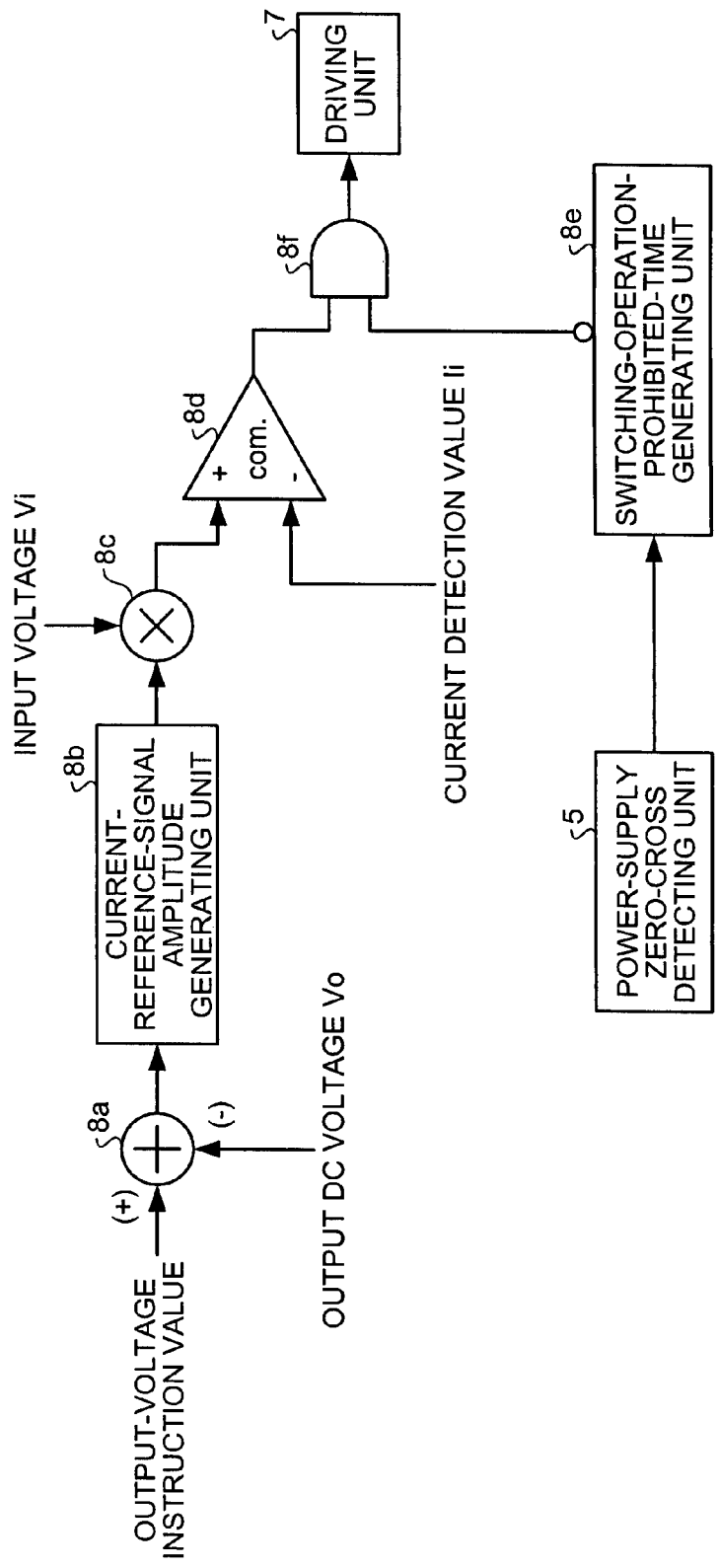
FIG. 24 is a schematic block diagram of a control unit included in the conventional power supply device.

When the switching operation controller 14h and the current controller 14j are configured as shown in FIG. 24, it is possible to achieve the current control in which the result of the multiplication is incorporated by changing the output-voltage instruction value used in the current control.

As explained above, even if there is an error in the voltage detection process performed during the current control because of the fluctuations in the voltage-dividing resistors R1 and R2 and the fluctuations in the A/D converter reference voltage AVR, it is possible to, by performing the voltage control, keep the output voltage Vo(t) constant, without having the output voltage Vo(t) affected by the detection error. Thus, it is possible to stabilize the current control, and also inhibit fluctuations in the input current waveform caused by the device being used together. Consequently, it is possible to improve adaptability of the power supply device.

EXAMPLE 2

Figure 17:
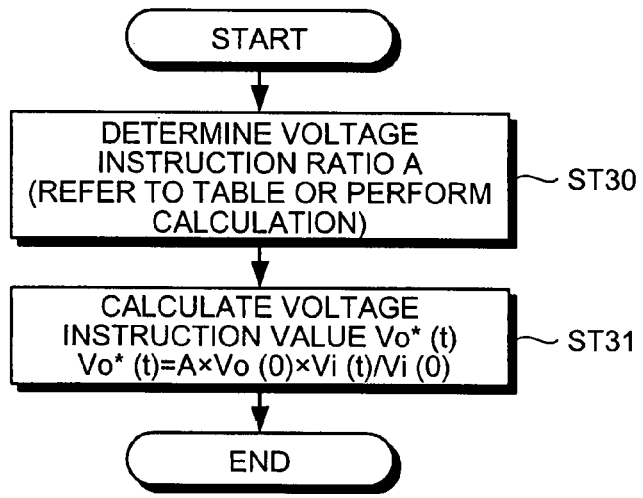
FIG. 17 is a flowchart for explaining a modification example of the process shown in FIG. 14.

Because the input current waveform also affects the input voltage Vi, it is acceptable to execute the AD-conversion processing system by using a routine shown in FIG. 17. In this method for obtaining the voltage instruction value Vo*(t) according to Example 2, the output voltage to be multiplied by the ratio A is obtained by multiplying a no-load output voltage Vo(0) by a ratio between an input voltage Vi corresponding to a loaded state and an input voltage Vi corresponding to a no-load state (Vi(t)/Vi(0)) (steps ST30 and ST31).

With this arrangement, because fluctuations in the input voltage Vi are taken into consideration, it is possible to maintain the input current waveform to be similar to the input voltage waveform even if the power supply voltage fluctuates. Thus, it is possible to further stabilize the current control. In addition, according to the first embodiment, because the voltage instruction value Vo*(t) is set based on the output voltage corresponding to a no-load state, it is possible to keep the ratio between an input voltage peak value and the output voltage constant, even if the power supply voltage is lowered because of an increase in the input current or even if the power supply voltage is raised or lowered because of an influence from another system connection device.

In Example 1 described above, the voltage control is exercised by using the no-load output voltage and the loaded output voltage. However, another arrangement is acceptable in which the power supply device includes: a unit that detects one of a rectified average value and an effective value of the DC-voltage rectified by the rectifying circuit 2; and a storing unit that stores therein one of a rectified average value and an effective value corresponding to a no-load state, so that the rectified average value or the effective value stored in the storing unit and the detected rectified average value or the effective value are used instead of the no-load output voltage and the loaded output voltage.

Figure 18:
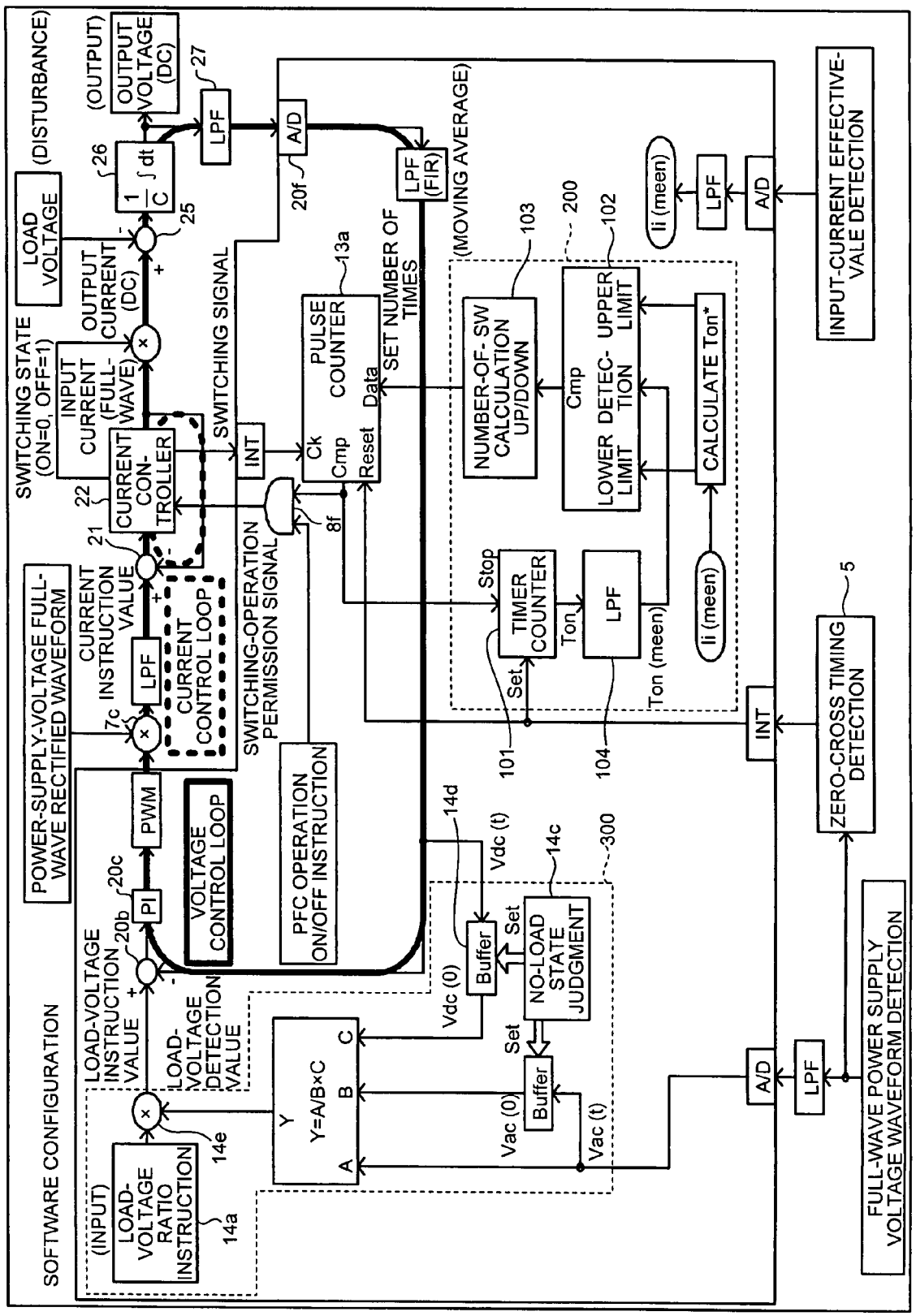
FIG. 18 is a block diagram of a configuration example of the fourth embodiment.

According to the fourth embodiment, as shown in FIG. 18, by combining the control (expressed with the reference numeral 200) explained in the description of the third embodiment with the load voltage ratio control (expressed with the reference numeral 300) explained in the description of Example 2 with reference to FIGS. 12 to 17, it is possible to stabilize the load voltage. Further, the entire converter system is able to achieve robustness against fluctuations related to the parts. In this situation, as shown in the control block diagram in FIG. 18, it is possible to keep the cost of the product low by configuring, with hardware, controls that require a relatively high speed and configuring, with software, other controls that tolerate slow processing systems. It is possible to configure the current controller 22 shown in FIG. 18 with the hysteresis comparator 8d shown in FIG. 11. Also, it is possible to easily combine the fourth embodiment with any other exemplary embodiments of the present invention.

Fifth Embodiment

A fifth embodiment of the present invention is explained below with reference to FIG. 19.

According to the fifth embodiment, only the lower-limit value (2.75) for the time Ton is set in the Ton upper-limit value/lower-limit value calculating unit 102. Also, according to the fifth embodiment, the use of the pulse counter 13a is omitted.

Figure 19:
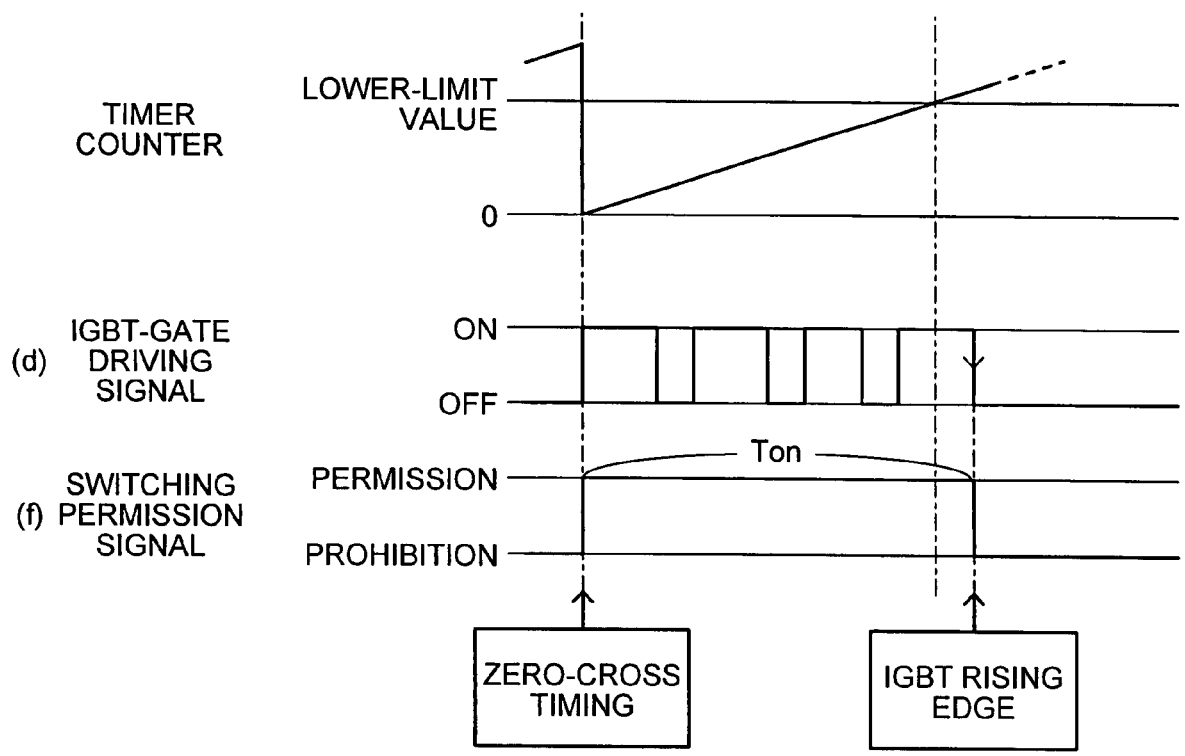
FIG. 19 is a time chart for explaining a fifth embodiment of the present invention.

As shown in FIG. 19, the timer counter 101 is reset by a reset signal (indicated as zero-cross timing in the drawing) being the detected power supply phase signal (zero cross)

from the power-supply zero-cross detecting unit 5. As a result, the timer counter 101 starts measuring a time Ton. At such a point in time that is immediately after a value measured by the timer counter 101 exceeds the lower-limit value (2.75) and when a trailing edge (indicated as IGBT trailing edge in the drawing) of the switching-off signal for the switching element 3c is detected, the switching permission signal is changed to a prohibition output.

With this arrangement in which the switching permission signal is changed to a prohibition output at such a time that is immediately after the measured value exceeds the lower-limit value (2.75) for the Ton time and when the switching-off signal for the switching element 3c has a trailing edge, it is possible to make sure, without fail, that the time Ton falls in the range defined by the lower-limit value (2.75) and the upper-limit value (3.10) that are shown in FIG. 7. In other words, with this arrangement in which the switching permission signal is changed to a prohibition output immediately after the measured value exceeds the lower-limit value (2.75), even if the upper-limit value (3.10) is not set in advance, the time Ton will never exceed the upper-limit value (3.10).

According to the fifth embodiment, because there is no need to use the pulse counter 13a, it is possible to realize cost reduction of the hardware or to reduce the load on the software.

Sixth Embodiment

A sixth embodiment of the present invention is explained below.

More specifically, in a simplified converter that does not so much require stabilization of the load voltage, it is acceptable to forcibly change the switching permission signal to a prohibition output so that the time Ton falls in the range defined by the upper-limit value (3.10) and the lower-limit value (2.75), without having the switching permission signal synchronized with the switching signal (the IGBT gate driving signal shown in FIG. 19). In this situation also, it is possible to make the instantaneous average values equal to one another in each of the switching operation intervals shown in FIGS. 9 and 10. Thus, it is possible to stabilize the power supply harmonic characteristic and to suppress the harmonic currents.

In other words, according to the fifth embodiment shown in FIG. 19, when the value measured by the timer counter 101 has exceeded the lower-limit value (2.75), the switching permission signal is changed to a prohibition output only after the trailing timing of the IGBT gate driving signal. However, according to the sixth embodiment, when the value measured by the timer counter 101 has exceeded the lower-limit value (2.75), the switching permission signal is immediately (forcibly) changed to a prohibition output, without waiting for the trailing timing of the IGBT gate driving signal.

According to the sixth embodiment, the switching permission signal is changed to a prohibition output at such a time when the value measured by the timer counter 101 exceeds the lower-limit value (2.75). However, alternatively, it is also acceptable to use the upper-limit value (3.75) or a predetermined value between the lower-limit value and the upper-limit value.

Seventh Embodiment

A seventh embodiment of the present invention is explained below.

The seventh embodiment is related to how to determine the upper-limit value and the lower-limit value.

Figure 21:
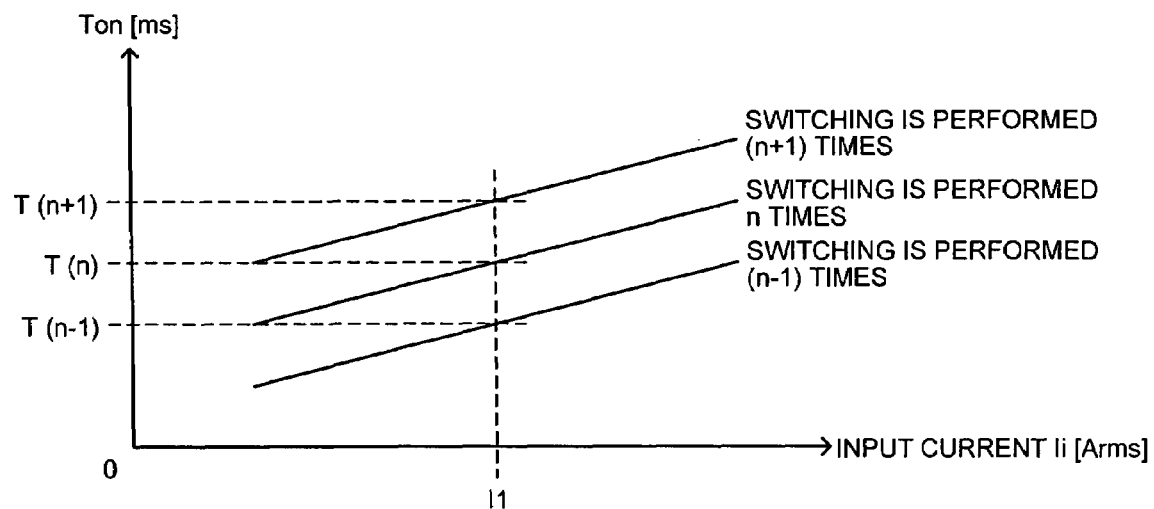
FIG. 21 is a chart for explaining a seventh embodiment of the present invention.

When the number of times the switching operation is performed is changed, the time Ton becomes longer. For example, as shown in FIG. 21, while the input current is Ii, if the number of times the switching operation is performed is changed from n times to (n+1) times, Ton becomes longer by $\{T(n+1)-T(n)\}$.

Figure 22:
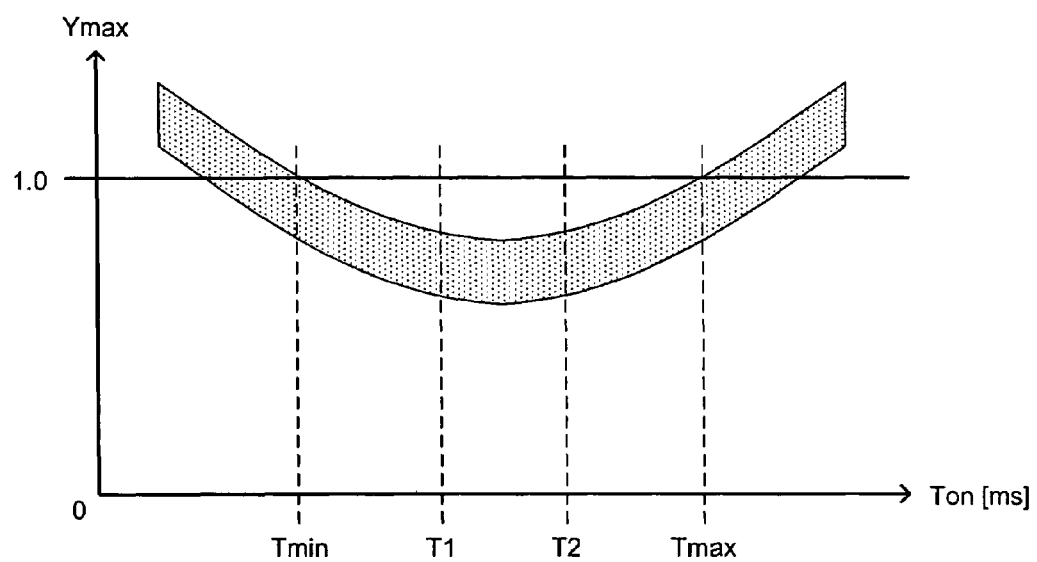
FIG. 22 is a chart that schematically plots the chart in FIG. 7.

FIG. 22 is a chart that schematically plots the tendency of the Ymax-Ton characteristic shown in FIG. 7.

As shown in FIG. 22, when the lower-limit value and the upper-limit value of Ton are set to T1 and T2 (T1 is larger than 2.75 that is a first threshold value Tmin for Ymax<1; T2 is smaller than 3.10 that is a second threshold value Tmax for Ymax<1), the difference between T1 and T2 needs to be larger than $\{T(n+1)-Tn\}$ by which Ton increases due to the change in the number of times the switching operation is performed.

The reason is because, if Ton is smaller than T1 when the number of times the switching operation is performed is n, and Ton exceeds T2 when the number of times the switching operation is performed is changed from n times to (n+1) times so that Ton increases by $\{T(n+1)-Tn\}$, it is not possible to exercise control to make Ton have an appropriate value (a value between T1 and T2) by changing the number of times the switching operation is performed.

As additional information, each of T1 and T2 needs to be between Tmin and Tmax, which are the two threshold values for Ymax<1, as shown in FIG. 14.

Eighth Embodiment

An eighth embodiment of the present invention is also related to how to determine the upper-limit value and the lower-limit value.

In the converter of the present example, an arrangement is acceptable in which the lower-limit value=Tmin, and the upper-limit value=Tmax are satisfied. However, when a range defined by the lower-limit value and the upper-limit value is arranged to be large, a situation arises within that range where a plurality of possibilities of conditions are satisfied at the same time, as to the number of times the switching operation is performed. In other words, the number of times the switching operation is performed can be either n times or (n+1) times. In such a situation, as shown in FIG. 14, it is acceptable to set T1 to be a value larger than Tmin, set T2 to be a value smaller than Tmax, and also to use such values that output a maximum power factor as T1 and T2. As a general tendency, the larger Ton is, the better the power factor is. Thus, an arrangement is acceptable in which both T2=Tmax and T1=T2−ΔTon are satisfied. In this expression, ΔTon denotes the amount by which Ton increases per one switching operation. Because the maximum power factor point may change depending on the input current value, it is also acceptable to correct T1 and T2.

Ninth Embodiment

A ninth embodiment of the present invention is a modification example of the eighth embodiment.

It is acceptable to set the values of T1 and T2 based on a maximum efficiency point, instead of the maximum power factor point used in the eighth embodiment, because the switching loss increases when the number of times the switching operation is performed is increased.

Tenth Embodiment

As explained above, when the control range defined by T1 and T2 is arranged to be small to achieve the maximum power factor and the maximum efficiency, there is a possibility that Ton does not fall in the control rage (the range between T1 and T2) even if Ton is increased by an amount corresponding to one switching operation, because of influences from fluctuations in the power supply voltage and fluctuations related to the parts. One example of such a situation is, if Ton<T1 is satisfied when the number of times the switching operation is performed is n, Ton>T2 will be satisfied when the number of times is increased to (n+1). In such a situation, it is a good idea to make the control range of Ton larger by changing the value of T1 or T2.

Eleventh Embodiment

The Ton-Ymax characteristics shown in FIGS. 7 and 22 are the results obtained when the output voltage is at a specific level. The results corresponding to FIGS. 7 and 22 will vary depending on the level of the output voltage, and more accurately speaking, the results will vary depending on the relation between the input voltage and the output voltage. Thus, an arrangement is acceptable in which results corresponding to FIGS. 7 and 22 are obtained in advance for different levels of output voltages, so that the values of T1 and T2 are corrected based on the level of the output voltage by referring to the obtained results.

Twelfth Embodiment

Application Circuit

Figures 1, 20:
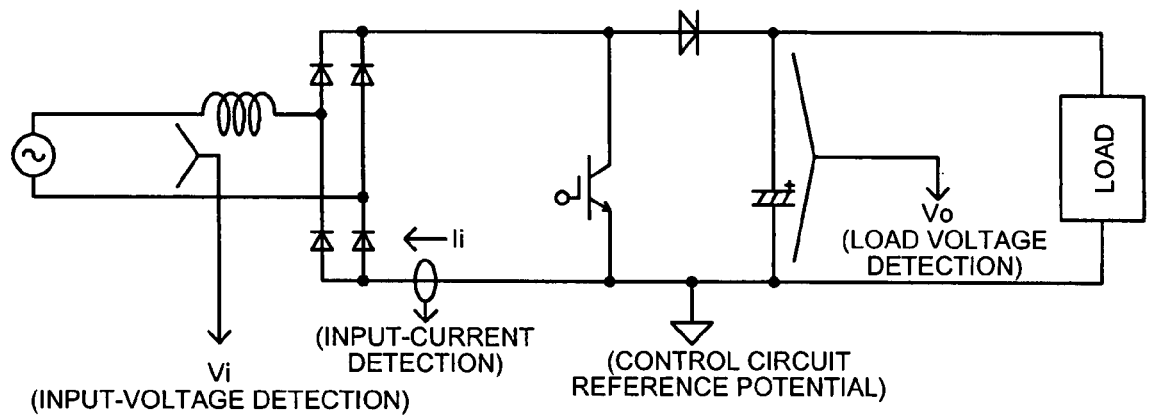
Figures 2, 20:
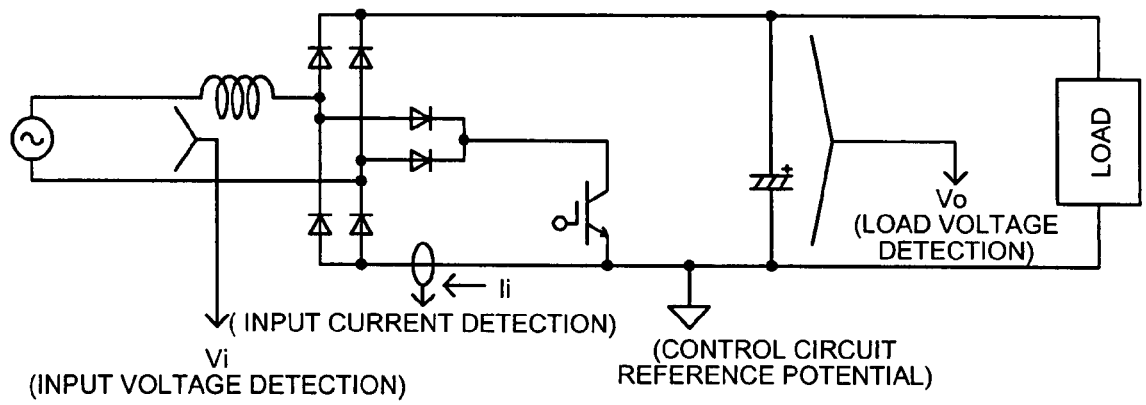
Figures 3, 20:
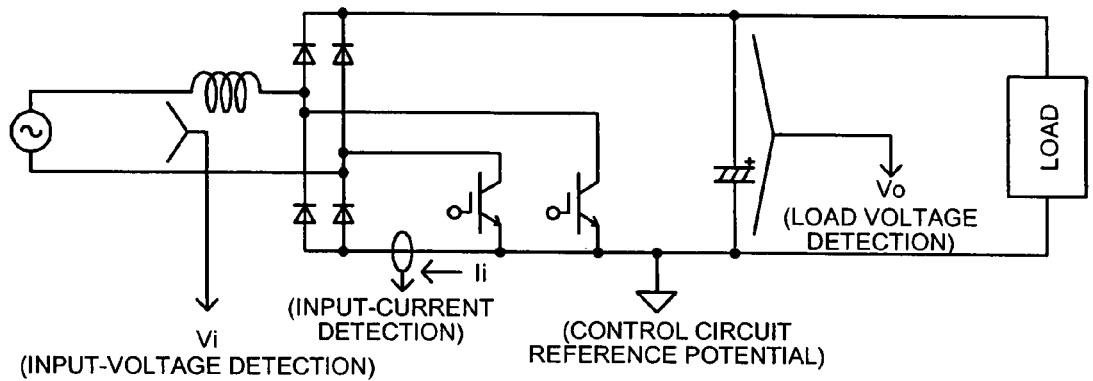
Figures 4, 20:
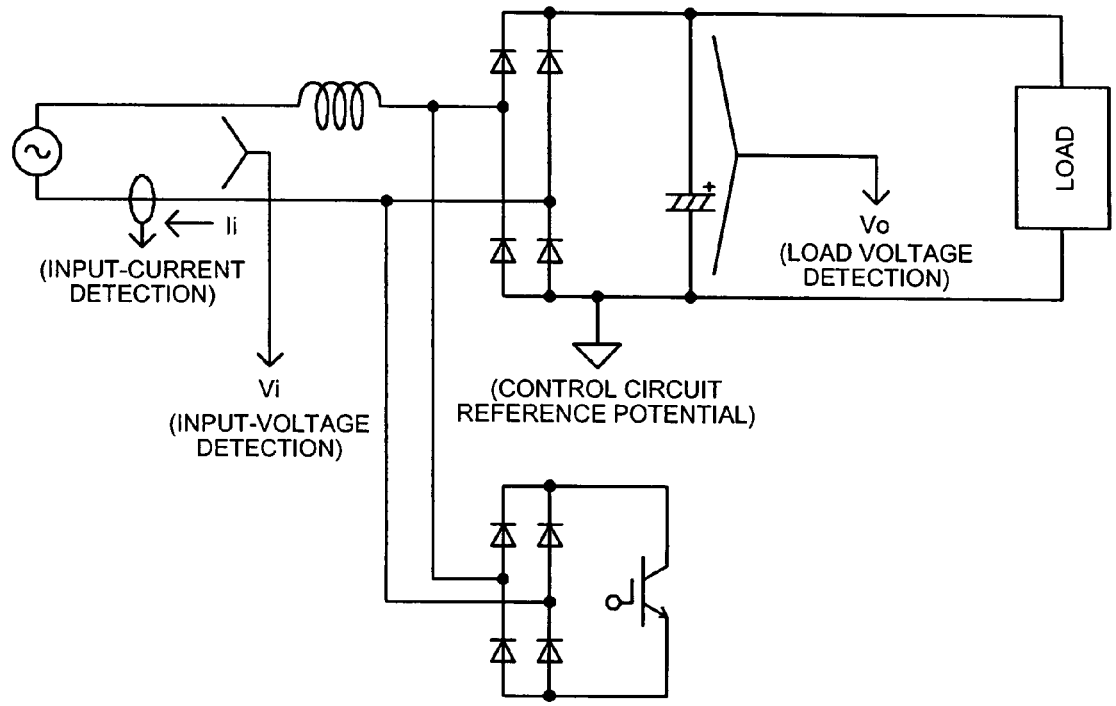

In the exemplary embodiments described above, the power improving circuit that is of a voltage boosting chopper type is used. Thus, it is possible to apply the present invention not only to the typical circuit shown in FIG. 1 but also to any power supply short-circuiting circuit connected via a reactor, as shown in FIGS. 20-1 to 20-4.

As explained above, according to the exemplary embodiments described above, it is possible to exercise control to be compliant with the power supply harmonic regulation, without being easily affected by the fluctuations related to the parts and the fluctuations in the power supply, and also to improve the power factor while performing the switching operation a small number of times. Further, it is possible to suppress power supply harmonics in such a manner that is universally compatible, and to easily achieve globalization of a product with which the power supply device of the present invention is installed.

INDUSTRIAL APPLICABILITY

According to the present invention, it is possible to stabilize the current control in the power supply device and to easily comply with the power supply harmonic regulation. Thus, the present invention is applicable not only to compressors for air conditioners and refrigerators but also to home electric appliances in general and industrial equipment.

The invention claimed is:

1. A power supply device that improves, when setting a voltage obtained by converting an alternate-current power supply into a direct-current voltage to a load voltage, a power factor by short-circuiting the alternate-current power supply via a reactor, wherein a switching operation is performed on a switching element of a power-factor improving unit that includes the reactor, an output voltage of the power-factor improving unit is set to the load voltage by switching on and off the switching element based on a result of comparison between an input current and an input-current reference signal of a power-supply voltage waveform, a zero cross of the alternate-current power supply is detected, the switching operation is performed on the switching element a predetermined number of times based on a detection of the zero cross, and number of switching the switching element is set in such a manner that a power supply phase of the alternate-current power supply is within 90 degrees.

2. The power supply device according to claim 1, wherein a switching start time of the switching element is changed according to any one of a load of the power supply device and an amplitude of the input current.

3. The power supply device according to claim 1, wherein the number of switching the switching element is determined based on at least one of, or a combination of, the load of the power supply device, the amplitude of the input current, and a frequency of the power supply.

4. The power supply device according to claim 1, wherein when the load of the power supply device is a motor connected via an inverter, the number of switching is determined based on any one of number of revolutions of the motor and an output frequency of the inverter.

5. The power supply device according to claim 1, comprising a voltage detecting unit that detects a voltage of the alternate-current power supply, wherein
the number of switching the switching element is determined based on a detected voltage.

6. The power supply device according to claim 1, wherein the switching operation of the switching element is completed in a predetermined time since the detection of the zero cross.

7. The power supply device according to claim 1, wherein the number of switching the switching element is counted by a counter function, and the counter function is reset by the detection of the zero cross.

8. The power supply device according to claim 6, wherein the number of switching the switching element is adjusted in such a manner that the switching operation of the switching element is completed in the predetermined time.

9. The power supply device according to claim 8, wherein if the switching operation of the switching element is performed after the predetermined time, the switching operation of the switching element is performed by decreasing the number of switching by a predetermined number of times.

10. The power supply device according to claim 8, wherein if the switching operation of the switching element is completed before the predetermined time, the switching operation of the switching element is performed by increasing the number of switching by a predetermined number of times.

11. The power supply device according to claim 8, wherein a correcting unit is provided, which corrects the predetermined time, if the switching operation of the switching element is not completed in the predetermined time after changing the number of switching.

12. The power supply device according to claim 8, wherein the predetermined time is changed according to any one of a frequency of the power supply, a level of a load, and a magnitude of the load voltage.

13. The power supply device according to claim 8 wherein the predetermined time is set based on a relation between a time during which the switching operation of the switching element is permitted and an evaluation index related to harmonics when any one of the input current, a power supply voltage, a reactor inductance, a current hysteresis width, and number of switching is set as a parameter.

14. The power supply device according to claim 8, wherein
an output voltage at a time of a no-load state and an output voltage at a time of a loaded state are detected, and
a voltage control is performed in such a manner that a ratio between the output voltage at the time of the no-load state and the output voltage at the time of the loaded state becomes a predetermined value.

15. The power supply device according to claim 14, wherein
the alternate-current power supply is converted into the direct-current voltage by a rectifying unit converts to be set as the load voltage, and
any one of a rectified average value and an effective value is used instead of the output voltage at the time of the no-load state and the output voltage at the time of the loaded state.

16. A power supply device that improves, when setting a voltage obtained by converting an alternate-current power supply into a direct-current voltage to a load voltage, a power factor by short-circuiting the alternate-current power supply via a reactor, wherein
a switching operation is performed on a switching element of a power-factor improving unit that includes the reactor,
an output voltage of the power-factor improving unit is set to the load voltage by switching on and off the switching element based on a result of comparison between an input current and an input-current reference signal of a power-supply voltage waveform,
a zero cross of the alternate-current power supply is detected,
the switching operation of the switching element is completed by a next switching-off signal for the switching element, after a predetermined time has elapsed since a detection of the zero cross, and
the switching operation of the switching element is completed at least during a predetermined interval within 90 degrees of the power supply phase.

17. The power supply device according to claim 16, wherein the predetermined time is changed according to any one of a frequency of the power supply, a level of a load, and a magnitude of the load voltage.

18. The power supply device according to claim 16 wherein the predetermined time is set based on a relation between a time during which the switching operation of the switching element is permitted and an evaluation index related to harmonics when any one of the input current, a power supply voltage, a reactor inductance, a current hysteresis width, and number of switching is set as a parameter.

19. The power supply device according to claim 16, wherein
an output voltage at a time of a no-load state and an output voltage at a time of a loaded state are detected, and
a voltage control is performed in such a manner that a ratio between the output voltage at the time of the no-load state and the output voltage at the time of the loaded state becomes a predetermined value.

20. The power supply device according to claim 19, wherein
the alternate-current power supply is converted into the direct-current voltage by a rectifying unit converts to be set as the load voltage, and
any one of a rectified average value and an effective value is used instead of the output voltage at the time of the no-load state and the output voltage at the time of the loaded state.

21. A power supply device that improves, when setting a voltage obtained by converting an alternate-current power supply into a direct-current voltage to a load voltage, a power factor by short-circuiting the alternate-current power supply via a reactor, wherein
a switching operation is performed on a switching element of a power-factor improving unit that includes the reactor,
an output voltage of the power-factor improving unit is set to the load voltage by switching on and off the switching element based on a result of comparison between an input current and an input-current reference signal of a power-supply voltage waveform,
a zero cross of the alternate-current power supply is detected,
the switching operation of the switching element is forcibly completed in a predetermined time since a detection of the zero cross, and
the switching operation of the switching element is forcibly completed at least during a predetermined interval within 90 degrees of the power supply phase.

22. The power supply device according to claim 21, wherein the predetermined time is changed according to any one of a frequency of the power supply, a level of a load, and a magnitude of the load voltage.

23. The power supply device according to claim 21 wherein the predetermined time is set based on a relation between a time during which the switching operation of the switching element is permitted and an evaluation index related to harmonics when any one of the input current, a power supply voltage, a reactor inductance, a current hysteresis width, and number of switching is set as a parameter.

24. The power supply device according to claim 21, wherein
an output voltage at a time of a no-load state and an output voltage at a time of a loaded state are detected, and
a voltage control is performed in such a manner that a ratio between the output voltage at the time of the no-load state and the output voltage at the time of the loaded state becomes a predetermined value.

25. The power supply device according to claim 24, wherein
the alternate-current power supply is converted into the direct-current voltage by a rectifying unit converts to be set as the load voltage, and
any one of a rectified average value and an effective value is used instead of the output voltage at the time of the no-load state and the output voltage at the time of the loaded state.

* * * * *